(12) United States Patent
Du et al.

(10) Patent No.: US 9,955,238 B2
(45) Date of Patent: Apr. 24, 2018

(54) METHODS AND SYSTEMS FOR WIRELESS TRANSMISSION OF DATA BETWEEN NETWORK NODES

(71) Applicant: Nanyang Technological University, Singapore (SG)

(72) Inventors: Wan Du, Singapore (SG); Jansen Christian Liando, Singapore (SG); Mo Li, Singapore (SG); Bingsheng He, Singapore (SG)

(73) Assignee: Nanyang Technological University, Singapore (SG)

( * ) Notice: Subject to any disclaimer, the term of this patent is extended or adjusted under 35 U.S.C. 154(b) by 0 days.

(21) Appl. No.: 15/001,523

(22) Filed: Jan. 20, 2016

(65) Prior Publication Data

US 2016/0212507 A1  Jul. 21, 2016

(30) Foreign Application Priority Data

Jan. 20, 2015  (SG) .............................. 10201500426

(51) Int. Cl.
  *H04Q 9/00*  (2006.01)
  *H04W 4/00*  (2018.01)
(52) U.S. Cl.
  CPC .............. *H04Q 9/00* (2013.01); *H04W 4/005* (2013.01); *H04Q 2209/40* (2013.01)
(58) Field of Classification Search
  CPC ..... H04Q 9/00; H04Q 2209/40; H04W 84/18; H04W 4/005; H04W 72/085; H04W 52/265; H04W 84/12; H04W 84/005; H04W 52/241
  See application file for complete search history.

(56) References Cited

U.S. PATENT DOCUMENTS

| | | | | |
|---|---|---|---|---|
| 2009/0168653 | A1* | 7/2009 | St. Pierre | H04L 45/00 370/238 |
| 2010/0029317 | A1* | 2/2010 | Budampati | H04W 52/08 455/522 |
| 2014/0161206 | A1* | 6/2014 | Kamra | H04L 25/02 375/295 |

OTHER PUBLICATIONS

Valerio Bioglio, and Marco Grangetto; On the Fly Gaussian Elimination for LT codes, Member, IEEE; IEEE communications Letters (Accepted for Publication Oct. 2009) CL2009-1824, pp. 1-3 (3 pages).
John W. Byers, Michael Luby, Michael Mitzenmacher and Ashutosh Rege, May 18, 1998; A Digital Fountain Approach to Reliable Distribution of Bulk Data, pp. 1-22 (22 pages).

(Continued)

*Primary Examiner* — Kabir A Timory
(74) *Attorney, Agent, or Firm* — Kevin P. Crosby; GrayRobinson, P.A.

(57) ABSTRACT

A network of environmental sensor nodes is proposed in which data is transmitted wirelessly between the nodes using a rateless erasure code with a redundancy which is matched to the effective data rate, thereby permitting distanceless link transmissions. The wireless sensor networks is suitable to be sparsely deployed over wide area. A communication protocol is proposed to efficiently coordinate the distanceless link transmissions. A new metric (expected distanceless transmission time) is proposed for routing selection. The distanceless transmissions are well-adapted to low duty-cycled sensor networks.

15 Claims, 10 Drawing Sheets

(56) References Cited

OTHER PUBLICATIONS

Qing Cao, Tarek Abdelzaher, Tian He, and Robin Kravets; Cluster-Based Forwarding for Reliable End-to-End Delivery in Wireless Sensors Networks; This full text paper was peer reviewed at the direction of IEEE communication Society subject matter experts for publication in the IEEE INFOCOM 2007 proceedings; 0743-166X/07/$25.00 copyright 2007 IEEE, pp. 1928-1936 (9 pages).

Peter Corke, Fellow IEEE, Tim Wark, Member IEEE, Raja Jurdak, Member IEEE, Wen Hu, Member IEEE, Philip Valencia, Member IEEE, and Darren Moore, Member IEEE; Environmental Wireless Sensor Networks, 0018-9219/$26.00 copyright 2010 IEEE; vol. 98, No. 11, Nov. 2010/ Proceedings of the IEEE, pp. 1903-1916 (15 pages).

Wan Du, Zikun Xing, Mo Li, Bingsheng He, Lloyd Hock Chye Chua and Haiyan Miao; Optimal Sensor Placement and Measurement of Wind for Water Quality Studies in Urban Reservoirs (12 pages).

Henri Dubois-Ferriere, Deborah Estrin, and Martin Vetterli; Packet Combining in Sensor Networks; Sensys '05, Nov. 2-4, 2005, San Diego, California, USA., Copyright 2005 ACM 1-59593-054-X/05/011 . . . $5.00, (14 pages).

Henri Dubois-Ferriere, Roger Meier, Laurent Fabre and Pierre Metrailler; TinyNode: A comprehensive Platform for Wireless Sensor Network Applications (8 pages).

Simon Duquennoy, Olaf Landsiedel and Thiemo Voigt; Let the Tree Bloom: Scalable Opportunistic Routing with ORPL; Sensys '13, Nov. 11-15, 2013, Rome, Italy, Copyright 2013 ACM 978-1-4503-2027—Jun. 13, 2011. . . $15.00, (14 pages).

Raghu K. Ganti, Praveen Jayachandran, Hiyn Luo, and Tarek F. Abdelzaher; Datatlink Streaming in Wireless Sensor Networks; Sensys '06, Nov. 1-3, 2006, Boulder, Colorado, USA., Copyright 2006 ACM 1-59593-343-3/06/0011 . . . $35.00, pp. 209-222 (14 pages).

Yi Gao, Jiajun Bu, Wei Dong, Shun Chen, Lei Rao, Xue Liu; Exploiting Concurrency for Efficient Dissemination Wireless Sensor Networks, 978-1-4577-0513-7/11/$26.00 copyright 2011 IEEE (8 pages).

Olaf Landsiedel, Euhanna Ghadimi, Simon Duquennoy and, Mikael Johansson; Low Power, Low Delay: Opportunistic Routing Meets Duty Cycling; IPSN'12, Apr. 16-20, 2012, Beijing, China. Copyright 2012 ACM 978-1-4503-1227—Jan. 12, 2004. . . $10.00 (12pages).

Philip Levis, Neil Patel, David Culler and Scott Shenker; Trickle: A Self-Regulating Algorithm for Code Propagation and Maintenance in Wireless Sensor Networks (14 pages).

Michael Luby; LT Codes; Proceedings of the 43rd Annual IEEE Symposium of Foundations of Computer Science (FOCS'02) (10 pages).

David Moss and Philip Levis; BoX-MACs: Exploiting Physical and Link Layer Boundaries in Low-Power Networking (12 pages).

Michele Ross, Giovanni Zanca, Luca Stabellini, Riccardo Crepaldi, Albert F. Harris III and Michele Zorzi; SYNAPSE: A Network Reprogramming Protocol for Wireless Sensor Networks using Fountain Codes; 978-1-4244-1777—Mar. 2008/$25.00 Copyright IEEE (9 pages).

Wan Du, Zhenjiang Li, Jansen Christian Liando and Mo Li; From Rateless to Distanceless: Enabling Sparse Sensor Network Deployment in Large Areas; SenSys'14, Nov. 3-5, 2014, Memphis, TN, USA. Copyright 2014 ACM 978-1-4503-3143—Feb. 14, 2011 . . . 15.00; http://dx.doi.org/10.1145/2668332.2668335 (14 pages).

Omprakash Gnawali, Rodrigo Fonseca, Kyle Jamieson, David Moss, and Philip Levis; Collection Tree Protocol; SenSys '09, Nov. 4-6, 2009, Berkeley, CA, USA. Copyright 2009 ACM 978-1-60558-748-6 . . . $5.00 (14 pages).

* cited by examiner

2

4

3

5

1

7

6

METHODS AND SYSTEMS FOR WIRELESS TRANSMISSION OF DATA BETWEEN NETWORK NODES

FIELD OF THE INVENTION

The invention relates to methods and systems for communicating data wirelessly within a network of nodes, and in particular a "multi-hop" network.

BACKGROUND OF THE INVENTION

In many environmental monitoring applications (such as forest monitoring, soil moisture measurement, ground water quality monitoring) sensors are sparsely deployed to over a wide area, e.g., hundreds of meters away from each other. The data sensed by the sensors is collected at a "sink", which may be one of the sensors. The other sensors transmit the data they sense to the sink by wireless transmissions. Thus, the sensors form a wireless communication network in which the sensors are respective nodes, also referred to in this document as "motes". Not all the sensor nodes transmit the data directly to the sink; instead, information can be relayed from one sensor node to another until it reaches the sink.

Unfortunately, traditional wireless sensor networks are not designed for a sparse network application such as environmental monitoring. Instead, they are designed for dense networks with sensor motes spaced apart by short communication distances. If conventional network communication techniques are used in a sparse network application, there is significant deployment waste, as many sensor nodes do not contribute to sensing data but just to maintaining the network connectivity.

It is viable to apply technologies like WiMAX and cellular communication to achieve long-distance communications. However, the power consumption of WiMAX (about 200 mW) and cellular modules (typically 500 mW transmission power) is too high for typical sensor motes powered by batteries (about 54 mW). If a commercial cellular communication network is used, extra data cost may be incurred. Other hardware aided solutions, e.g., using high transmission power, or special hardware like high gain or directional antennas, are typically not applicable. Power consumption is a major consideration. Excessively higher power will be incurred to ensure communication quality over longer distances. In many places, such high transmission power in the ISM band is prohibited. For example, the maximum transmission power of 868 MHz is limited to 25 mW (14 dBm) for outdoor use in Singapore and Europe. Furthermore, those solutions add additional hardware overhead and impair the generality, e.g., most general MAC (media access control) and routing approaches are based on omnidirectional antennas and cannot be applied to directional antennas.

Some low-power sensor devices have been developed for long-distance communication, such as TinyNode [11] and Fleck-3 [8]. They provide long communication distance with low data rates. For instance, TinyNode adopts the Semtech XE1205 RF radio that increases the receiver sensitivity by a built-in low-noise amplifier and a baseband amplifier. TinyNode is able to achieve a theoretical communication distance up to 1.8 km by lowering the bit rate to 1.2 kb/s. Those long-distance devices provide the opportunity of building a sparse sensor network across large areas.

SUMMARY OF THE INVENTION

The present inventors carried out a number of experiments using the TinyNode system in various environments. Using a packet size set to 76 bits (note that the word "packet" is used in this document interchangeably with the word "frame"), we found that the communication range achieved in practice (about 1.3 km) was much smaller than its theoretical value (about 1.8 km). The communication range was significantly impaired because the high sensitivity the receivers require for decoding weak signals makes decoding vulnerable to the multi-path effect from surrounding obstacles, e.g., buildings, vehicles, water surface, etc. The experiments revealed that although a wide range of tunable parameters (e.g. bit rate and transmission power) are provided in a TinyNode system, it provides inadequate channel adaptation capability in many practical situations.

However, although packet reception rate (PRR) decreased rapidly as the communication distance increased, we found that the number of erroneous bits in the majority of the corrupted packets was low. This observation led us to wonder whether we could extend the communication distance by using the correct bits contained in each received packet. We investigated the byte reception rate (BRR) which measures the correct bytes received by the receiver as a proportion of the total bytes transmitted by the transmitter. This demonstrated that communication rate could be significantly increased with a relatively high BRR.

Forward Error Correction (FEC) approaches (e.g., BCH codes and Reed-Solomon codes) and hybrid Automatic Repeat-reQuest (ARQ) can harness the correct bits in corrupted packets. However, they mainly focus on the error correction over well-established links and require accurate channel estimation to gauge proper redundancy to compensate for the bit error, which is difficult in sparse WSNs. Even worse, if sensor nodes are duty-cycled, it is more challenging to achieve accurate channel estimation and the system suffers from a long delay to remedy erroneous bits by redundant bits. Moreover, Simple Packet Combining (SpaC) combines the received or overheard corrupted packets to recover the original data, whereas the recovery code is the same length as the original packet, which is equivalent to the packet retransmission.

The present invention aims to provide new and useful systems for transmitting data wirelessly within a network of nodes.

In general terms the invention proposes that transmitting data within a network of environmental sensor nodes using a rateless erasure code (that is, a code which does not exhibit a fired code rate), with a redundancy which is matched to the effective data rate. The redundancy is provided by repeatedly sending the same encoded units of data.

The rateless erasure codes make it possible to provide "DistanceLess Transmissions" (DLT). That is, the communication distance may be extended beyond the current hardware limit by matching the data transmission rate to the quality of the links of the communication channel.

The DLT may successfully exploit the link capacity and automatically adjust to a suitable effective bit rate for both near and far receivers. DLT can make efficient use of long-distance links which are conventionally not favoured. Data transmission becomes distance oblivious and can easily fit to potential receivers at different distances. As a result, the network connectivity may be enriched and the network diversity can be fully exploited.

Translating the idea into a practical system, however, entails a variety of challenges. Rateless codes are usually designed for high-end devices and incur unacceptable decoding overhead for resource-constrained sensor nodes.

To address this we firstly propose using a metric to evaluate the quality of the communication link between pairs of nodes, and routing of signals through the network based on the metric. This allows the DLT to be significantly optimized by fully exploiting the network diversity.

One possible form of metric is referred to here as the "expected distanceless transmission time (EDTT) metric. This is based on an average, over the block sizes included in data packets transmitted by a given node, of a measure of the quality of the link to a second node for a given block size. The average typically includes a weighting according to the probability with which the node uses that block size.

An EDTT can be easily incorporated into the Collection Tree Protocol (CTP) for network data collection.

Preferably, the embodiment uses the DLT for low duty-cycled MACs, which gives advantages for energy conservation. The use of duty-cycled MACs and other optimization issues have not been considered in conventional rateless code design, although duty-cycling is a conventional sensor network technique to provide energy conservation.

Additionally, we propose a link layer protocol to coordinate the synchronized rateless transmissions in each link of the network used for data transmission.

For one link transmission, it is desirable for the receiver to decode each received packet rapidly and inform the transmitter in a timely way to terminate the continuous transmission. Preferred embodiments of the present invention use Luby Transform (LT) code.

We additionally address the problems of encoding efficiency and decoding delay.

LT code encodes blocks of data together to form a signal, and repeatedly transmits the signal to a receiver until the receiver confirms that is has enough information to decode all the blocks. To address coding delay, we propose that the receiver attempts to decode the blocks before the receiver has received sufficient information to decode all the blocks, to minimise the additional work which has to be done when that sufficient information is received. This reduces encoding delay.

The invention can be expressed in terms of the method performed by any one or more of the nodes, or the method collectively performed by the plurality of nodes. Alternatively, it may be expressed as single one of the nodes, having a processor, a transceiver and a data storage device storing non-transitory program instructions operative by the processor to cause the node to perform the method. Alternatively, it can be expressed as a network comprising or consisting of such nodes. The invention may also be expressed in terms of the computer code operative, when run by a processor of one of the nodes, to cause the node to carry out the method.

Note that the communication method of the nodes and network is automatic, that is performed substantially without human intervention, except perhaps for initialization.

BRIEF DESCRIPTION OF THE DRAWINGS

An embodiment of the invention will now be described for the sake of example only, with reference to the following figures, in which.

DETAILED DESCRIPTION OF THE EMBODIMENT

An embodiment of the invention will now be explained. Section 1 provides an overview of the embodiment. Section 2 provides a detailed description of DLT in the embodiment, and in particular its novel features. Section 3 provides experimental results, and Section 4 compares the embodiment to other data transmission techniques used in the literature.

1. Overview

Figure 1:
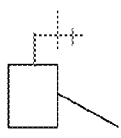
FIG. 1 shows schematically a network of sensor nodes which is an embodiment of the invention.
Figure 1:
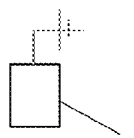
Figure 1:
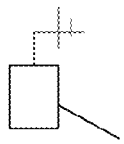
Figure 1:
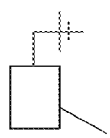
Figure 1:
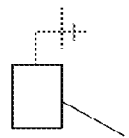
Figure 1:
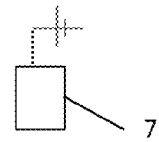
Figure 1:
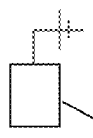

Referring firstly to FIG. 1, a sensor node network 1 is shown, comprising N sensor nodes 1, 2, ... N. For simplicity N=7 nodes are shown in FIG. 1, but the number may be lower or higher than that. Each node is provided with equipment for making a measurement of at least one parameter of the environment in which the node is located, to generate sensor data. Each node is also provided with a respective antenna which is adapted for transmission and reception of signals. The antennas may be omnidirectional, although in certain embodiments they may have a directionality.

At least one node 1 is a "sink" node, to which the data connected by the other nodes 2, ..., N is transmitted. The sink node may include a data storage device which collects the data, which is subsequently extracted (e.g. by a human operator). Alternatively or additionally, the sink node 1 may have an additional communication interface which enables the sink node 1 to transmit data to an additional location (not shown) where data can be collected. For example, the communication interface may be an internet connection.

In a variant of the embodiment, the sink node 1 may be a node which is not be provided with sensing equipment. In other words, in this case the sink node does not have a sensing role in addition to its roles of collecting data and/or transmitting it out of the network.

The nodes 2, ..., N transmit the sensor data to the sink node 1. In the case of some nodes, the sensor data is not transmitted directly, but relayed though other nodes. For example, the sensor 2 may be too far from the sink node 1 to transmit data to it directly, and therefore the sensor data collected by the node 2 is relayed through the node 5.

Alternatively, the sensor data collected by the node 2 may be relayed first to the node 4, then to the node 3 and then to the sensor. The quality of possible communication links is not known a priori, and depends on the environment (e.g. what buildings are present). It may be that although the distance between nodes 1 and 5 is relatively short, it is hard to form a reliable communication channel between them, and the sensor data collected by node 5 must be relayed first to node 2, then to node 4, then to node 3 and finally to node 1.

Figure 2:
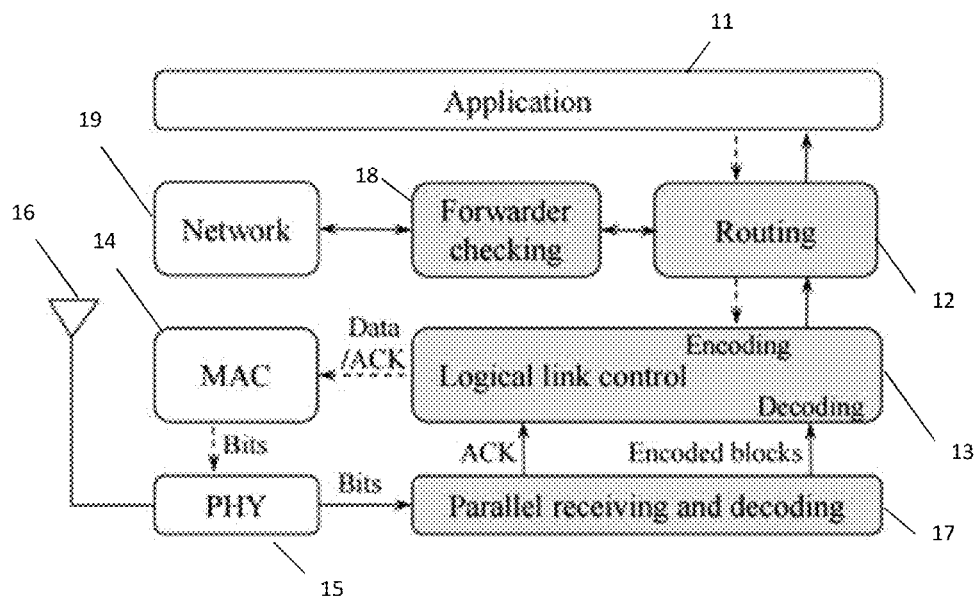
FIG. 2 shows the structure of a node which is an embodiment of the invention.

FIG. 2 shows the structure of one of the nodes 2, . . . , N. The arrows show the flow of signals, with solid arrows relating to data transmission (i.e. transmission of data out of the node) and solid arrow relating to data reception into the node. The shaded units in FIG. 2 represent components which may be implemented in invovative ways described below. It comprises an application layer 11, which controls one of more sensor elements for sensing the environment of the node, to generate the sensor data. The unit 11 is used to give commands such as "get sensor data", "send to sink node", etc. The command is passed down the layers to perform the corresponding actions. The node further comprises a routing unit 12 which transmits the sensor from the application layer 11 to a logical link control unit 13 which is operative to perform encoding and decoding.

The logical link control unit 13 encodes data by a scheme explained below. In general terms, when the node is acting as a transmitter for sensor data (i.e. either transmitting sensor data produced by the application layer 11, or forwarding sensor data received from another node the signals generated by the logical link control unit 13 encode that data.

When the node is acting as a receiver for sensor data from another node, the logical link control unit 13 generates an acknowledgement signal ACK, as explained below.

The logical link control unit 13 transmits its output to a MAC layer unit 14 which generates a data packet in a format explained below. The MAC layer unit 14 transmits the packet as a stream of bits to a physical layer control unit 15, which generates a RF signal which is transmitted by an antenna 16. The physical layer control unit 15 and the antenna 16 together operate as a transceiver, which can both send and receive data, but not at the same time.

The antenna 16 can also receive a RF signal, which it passes to the physical layer control unit 15. The physically layer control unit 15 resolves the RF signal into bits, and passes them to a parallel receiving and decoding unit 17. When the node is acting as a transmitter for sensor data, the RF signal encodes an acknowledgement signal, and the parallel receiving and decoding unit 17 resolves this as an ACK signal or NAK signal, which is passed to the logical link control unit 13. As explained in detail below, the logical link control unit 11 can determine from the ACK or NAK signal whether the sensor data has been successfully received, or whether it must generate a signal again. A NAK signal encodes the number of additional symbols required for a successful decoding; based on this information the sender will prepare additional signals (as described below, this number of additional signals will be based on a measure called EDTT) and transmits them to the receiver.

When the node is acting as a receiver for sensor data, the output of the parallel receiving and decoding unit 17 is encoded blocks, which are transmitted to the logical link control unit 13. The logical link control unit 13 decodes the blocks, and then generates an appropriate ACK signal as described below. The logical link control unit 11 passes the decoded blocks to the routing unit 12, which passes them back to forwarder checking unit 18, which coordinates the retransmission of the received data, by passing it back to the encoder at an appropriate time. The unit 19 determines which other node to relay data to. It maintains information about which other nodes it has a direct signal communication path to, and which other node to use as a relay when it is trying to send the sensor data to the sink node.

All of units 11 to 15 and 17 to 19 are implemented within a microcontroller. The microcontroller maintains the routing table, performs encoding and decoding, checks correctness of packets, and provides data bits to be sent through the antenna. The antenna/radio has its own processing chip which is separated from the microcontroller.

The sink node 1 may have the same structure as in FIG. 2. Furthermore, it may, as mentioned above, comprise an additional data storage device for storing the data sensed by the nodes 2, . . . , N and/or an additional communication interface, for transmitting this data out of the network.

As illustrated in FIG. 2, DLT is implemented as an extension to the conventional PHY, MAC, and Network layer protocol. DLT operates by intercepting transmission data for encoding and received data stream for decoding and packet acknowledgement (ACK or NAK). The embodiment uses Luby Transform (LT) code and adopts many features of the TinyNode implementation. The transmission is controlled by a metric parameter called EDTT, which represents the quality of a communication channel. EDTT is calculated before the transmission begins (see below), and repeatedly updated.

Figure 3:
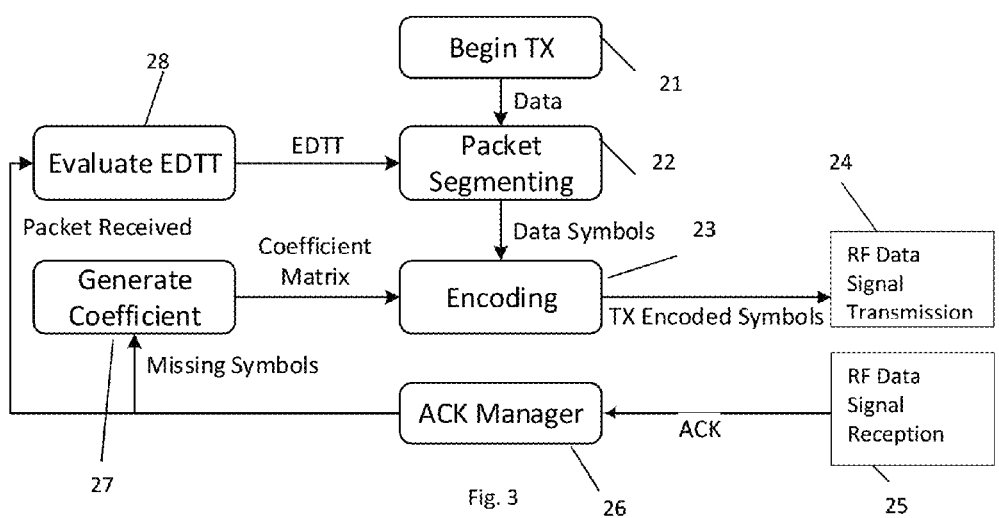
FIG. 3 shows schematically the flow of information when the node of FIG. 3 is operating in a transmission mode.

The process flow in the transmission mode of the node is shown in FIG. 3 as a flow chart. The transmission mode is entered in step 21. In step 22, the sensor data is segmented into data symbols by the logical link control unit 13 according to the symbol size determined by EDTT.

According to the LT coding system, in step 23 the logical link control unit 13 encodes the data symbols according to a coefficient matrix to generate encoded symbols. The encoded symbols are further attached with a byte of Cyclic Redundancy Check (CRC) code before transmission begins. Performing step 23 will generate a number M of encoded blocks (0, . . . , M).

In step 24 the encoded symbols are transmitted by the MAC layer unit 14, physical layer control unit 15 and antenna 16 to another sensor node 1, . . . N, which acts as a receiver.

The transmitter then awaits an ACK (or NAK) signal from the receiver for a fixed period of time. If no ACK (or NAK) is received during the time period, the transmitter will generate and transmit the next encoded symbols until an ACK is received. This entails performing step 23 again (but not step 22), to generate a new set of encoded blocks (M+1, . . . , M+K).

In step 25, an RF signal is received by the antenna 16 and translated into bits by the physical layer control unit 15.

In step 26 it is interpreted by an ACK manager sub-unit of the physical layer control unit 15 as an acknowledgement signal, ACK or NAK. ACK indicates that the receiver has correctly received enough blocks to decode them. NAK contains a number which is the number of missing symbols required by the receiver. In other words ACK can be thought of as a NAK which contains zero. It also possible the ACK manager will interpret the data is receives as a NO ACK, which means that the ACK or NAK was lost in the transmission process.

In step 27, the number of missing symbols is used to generate the next rows of the coefficient matrix, which are obtained as a continuation of the series which was used to generate the previous rows of the coefficient matrix. The logical link control layer 13 of the transmitter calculates the number of required symbols to generate by incorporating the expected number of symbols lost during transmission with the number of required symbols from receiver, as explained in more detail below. This cycle will repeat until the ACK is received, which indicates that no more encoded symbol is required.

The EDTT of the communication link is calculated in step 28. This is done by the routing layer 12 based on information received from the logical link control layer 13 relating to the number of symbols lost during transmission. This is passed to the logical link control unit 13 to be used for future sets of blocks.

Figure 4:
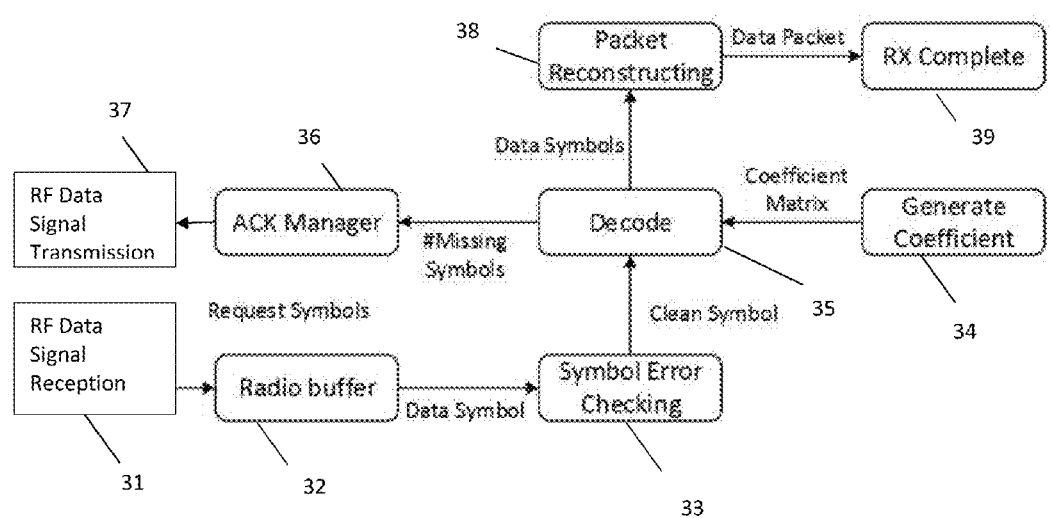
FIG. 4 shows schematically the flow of information when the node of FIG. 3 is operating in a reception mode.

The process flow of DLT on the receiver side is illustrated in FIG. 4. In step 31, an RF data signal is received. In step 32, the received signal is pooled within a radio buffer in the PHY layer unit 15 until sufficient number of bits are received for an encoded symbol to go through error checking (step 33). If the encoded symbol passes error checking, the symbol is referred to as "clean", and the symbol will be included in the decoding procedure.

The decoding procedure (step 35) uses a coefficient matrix obtained in step 34. It starts with every clean encoded symbol until there are either no more clean encoded symbols or all the data symbols have been successfully decoded. The outputs of step 35 are decoded data symbols, and a value indicating the number of symbols which cannot be decoded.

In case where there are no more clean encoded symbols, the ACK manager requests for more encoded symbols by generating an NAK (step 36) including the required number of symbols, and transmitting it (step 37). This cycle repeats until the data symbols have been successfully decoded (i.e. the number of missing signals which is generated in step 35 is zero). In this case, the ACK manager generates an ACK symbol which is transmitted in step 37.

When all data symbols have been successful decoded, the data symbols are then arranged to reconstruct a data packet (step 38), and the data is passed to the application layer. The reception process terminates (step 39).

2. Detailed Description of Operation of the Embodiment

The embodiment provides reliable and efficient data collection across sparse wireless sensor networks. At the link layer, the embodiment leverages rateless codes to improve the transmission quality over links of different communication distances. At the network layer, the embodiment incorporates its link design into the common routing stack of sensor networks in both full-active and low duty-cycled mode based on a new link metric.

2.1 Rateless Codes for Sensor Motes

Many light-weight rateless codes, e.g., Luby Transform (LT) code [35], Random Linear (RL) code and Online code, encode data into rateless units and automatically achieve a proper bit rate for a given link. They are viable for low-profile wireless sensors. With those rateless codes, nodes divide one packet of into k blocks ("original blocks"), denoted as $\{B_1, B_2, \ldots B_k\}$, which are used to generate encoded rateless blocks, $\{Y_1, Y_2, \ldots \}$. For one rateless block, a certain number of randomly selected original data blocks are linearly combined. To each rateless block is attached a one-byte Cyclic Redundancy Check (CRC) checksum. A received block is referred to as "clean" if this checksum matches a checksum calculated at the receiver. Once a node receives m (m≥k) clean rateless blocks that pass the CRC checking, it can use the Gaussian Elimination (GE) algorithm or the Belief Propagation (BP) algorithm to recover the original packet. The decoding efficiency of a block-based rateless code is calculated as k/m, which measures how many additional blocks (m−k) are required to recover the original packet. RL code has the optimal decoding efficiency (100%), but its decoding time is extraordinarily long, because it uses modular multiplication with random numbers in a finite field to linearly combine original blocks. LT and Online codes use the light-weight exclusive disjunction (XOR) operations, so have are relatively quick to decode, but they degrade the decoding efficiency. The performance of online code is usually highly determined by complex parameter tuning. However, LT coding is robust and provides a good balance between decoding efficiency and computation complexity. It can recover the original packet from $k+O(k \ln 2(k/\delta))$ encoded blocks with a successful probability of 1-δ and an average computational overhead of $O(k\ln(k/\delta))$ [35]. For this reason, the embodiment uses LT coding.

The encoded blocks are denoted by $Y_i$, $1 \leq i < \infty$. In LT coding [35], each encoded block $Y_i$ is generated by the bitwise modulo-2 sum of d original blocks which are randomly and uniformly chosen from the k original blocks, where d=1,2, . . . ,k. The selection of degree d is different for each $Y_i$. It is determined by a probability distribution $\rho(d) = \{p_j, 1 \leq j \leq k\}$, where $p_j$ is defined for each integer value of j. $p_j$ is the probability that the number d of original blocks selected to encode $Y_i$ is equal to j.

The exact choice of which d orginal blocks is used to form each encoded block $Y_i$ is encoded in a matrix called the encoding coefficient matrix l, which is a binary matrix. The width of the matrix is equal to the number of original blocks k and each column of the matrix corresponds to one original block. Each row indicates how a rateless block is encoded. Specifically, each row of the encoding coefficient matrix contains an instruction on how $Y_i$ is to be XORed. For example, a 1 in column 1 means that $Y_i$ contains the first block (data symbol), and so on. The blocks whose corresponding column is equal to 1 are XORed to calculate the encoded block. In the embodiment, a given transmitter generates l using a random number generator using a seed value which is known to the receivers.

The decoding efficiency of LT code depends on the degree distribution. The default robust Soliton distribution in LT code is mainly optimized for long packets containing thousands of symbols in cellular or satellite communication. Its decoding efficiency is low for the small packets in wireless sensor networks. For instance, it requires on average 26.9 encoded blocks to recover a packet of 16 original blocks. For this reason, the embodiment uses the degree distribution optimized in SYNAPSE [39], which reduces the average number of requested blocks to 17.9.

2.2 DLT Link

This section of the document explains distanceless link transmissions and addresses the decoding issue to implement LT code on sensor motes.

2.2.1 Distanceless Link Coordination

With DLT, a transmitter encodes data into rateless blocks and transmits an encoded stream. At a given time point, the nodes with different distances to the transmitter may receive a different number of clean blocks. As the transmitter keeps sending the encoded block stream, all receivers will succeed in decoding the original blocks by accumulating sufficient clean blocks. For a single link transmission, after recovering a packet, the receiver should inform the transmitter to terminate its transmission and release the channel immediately.

As low-power wireless radio is half-duplex, we let the transmitter send frames, where one frame contains multiple blocks. Before transmitting the next frame, the transmitter waits for the feedback (e.g., ACK or NAK) from a receiver in a short time interval (e.g., 0.5 ms). Upon receiving one frame, if the decoding succeeds, the receiver replies with an ACK to terminate the transmission; otherwise, it replies with a NAK containing the number of missing blocks and the transmitter sends another frame containing the requested number of rateless blocks.

To enable rateless link transmission, the receiver needs to send timely feedback to the transmitter after successful decoding. The BP algorithm is computationally lightweight. However, it imposes strict requirements on the degree of received clean blocks, deteriorating the decoding efficiency. The embodiment therefore uses the GE algorithm, which can decode the packet successfully as long as k linearly independent blocks are received. The computational complexity of GE is relatively high, i.e., $O(k^3)$ for decoding k original blocks, which may not satisfy the timing requirement of link transmissions. We tackle the high computational complexity issue of GE and propose a fast decoding approach.

2.2.2 Fast Decoding

To decode one packet using the GE algorithm, each receiver requires the encoding coefficient matrix l used by the transmitter for generating the rateless blocks. The receivers can reproduce an identical matrix using the same seed.

By knowing the coefficient matrix l, the GE algorithm decodes a packet in two steps: triangularization and backward substitution. These steps aim to obtain a triangular coefficient matrix using linear operations of rows in l. If l has full rank, the data packet can finally be recovered. However, the GE algorithm is time consuming for a low-profile sensor devices, e.g., it takes 1.2 ms for TI MSP430 microcontroller to decode a 64-byte packet composed of 8 blocks, which is much longer than the waiting interval of 0.5 ms.

Figure 5A:
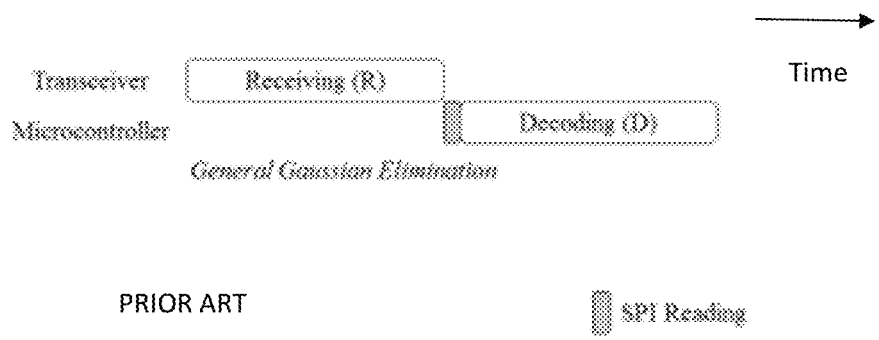
FIG. 5A shows schematically the timing of coding and decoding in a general Gaussian elimination decoding process carried out in a known transmission system.

The process is shown in FIG. 5A, where the time axis is the left-to-right direction. First, the transceiver of the node receives the RF signal during a period marked "Receiving (R)". Then there is a period of SPI (Serial peripheral interface) reading. Then there is a period in which the received original blocks are decoded by the microcontroller (the period marked "Decoding (D)").

We accelerate LT decoding based on two key observations. First, the decoding time of a frame is much less than the receiving time on sensor motes, e.g., it takes 8 ms to receive a 76-byte frame with the bit rate of 76.2 kb/s on Semtech XE1205 radio and 1.2 ms to decode the same frame on TI MSP430 microcontroller. Second, before starting the decoding process using the GE algorithm, the microcontroller has to wait until the whole frame is received. Thus, we shorten the frame processing delay by paralleling the GE decoding with the frame receiving.

Figure 5B:
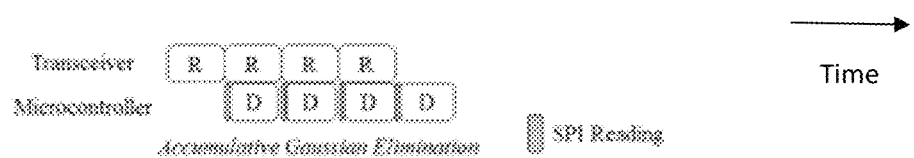
FIG. 5B shows schematically the timing of coding and decoding in an embodiment of the invention.

FIG. 5B illustrates the timing of decoding process carried out by the embodiment. The reception process performed by the transceiver is as in FIG. 5A, but it is illustrated in FIG. 5A divided into a number of periods (marked "R") in which the respective clean encoded blocks are received. The microcontroller of the receiver node (lower line in FIG. 5B) starts updating the coefficient matrix as soon as the first two clean encoded blocks are received. After each clean encoded block is received, it performs the GE decoding during the reception of next encoded block. In other words, the embodiment uses the idle time while receiving blocks to perform a decoding task. In fact, the total decoding time is longer than in a conventional system, but most of that decoding time is during the idle time. Thus, the time needed for decoding after all clean encoded blocks are received, is much less than in the conventional system of FIG. 5A.

2.2.3 Accumulative Gaussian Elimination

We develop an Accumulative GE (AGE) algorithm to parallelize the GE decoding with the frame receiving. Unlike the existing incremental GE algorithms [3], which only performs the triangularization incrementally, AGE strives to finish both triangularization and backward substitution before new blocks arrive. Algorithm 1 describes how a new received block is added in AGE decoding accumulatively. A matrix with a single sub-script denotes the corresponding row of the identity matrix (e.g. $l_j$ denotes the j-th row of l). The key idea is to transform the top left submatrix in the coefficient matrix into an identity submatrix step by step using the GE algorithm as new blocks are accumulated gradually. If a new block cannot be used immediately to extend the submatrix, it will be stored temporarily and utilized later when more blocks are received.

---

Algorithm 1: Accumulative Gaussian Elimination

1:   Input: $Y_i$: the new received block. R: rank of the coefficient matrix l.
2:   Output: Decoding result (isSolved) and decoded original blocks.
3:   Insert the coefficient vector of $Y_i$ to the $j_{th}$ row of the coefficient matrix l. Note that not all received blocks are clean, so the coefficient vector for $Y_i$ need not necessarilty be located at the i-th row of l, so the variable j is used to denote the row of j which corresponds to a given position of the received clean blocks within the coefficient matrix.;
4:   j = R+1;
5:   for n = j; n <= i; n + + do //Try another temporal blocks.
6:     for m = 1; m <= j; m+ + do //Triangularization
7:       if $l_{j,m}! = 1$ then
8:         $l_j = l_m \oplus l_j; Y_j = Y_m \oplus Y_j$ ;
9:       end if
10:    end for
11:    if $l_{j,j} == 1$ then //Triangularization successes.
12:      for m = i; m > j; m - - do //Backward substitution
13:        if $l_{j,m} == 1$ && m! = j then
14:          $l_m = l_m \oplus l_j; Y_m = Y_m \oplus Y_j$
15:        end if
16:        R++;
17:      end for
18:      return checkCoefficientMatrixFullRank(l);
19:    else//Triangularization fails. Use the previously received blocks.
20:      $l_j = l_j \oplus l_{n+1}; Y_j = Y_j \oplus Y_{n+1}$
21:    end if
22:  end for
23:  return False;

---

Figure 6:
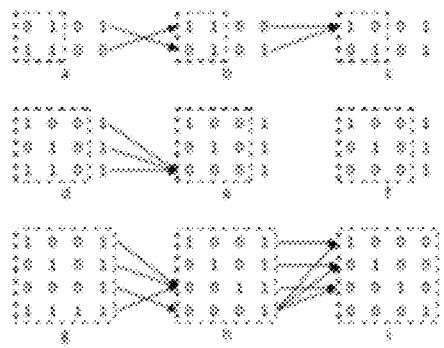
FIG. 6 shows an example of accumulative Gaussian decoding in the embodiment of the invention.

An example of AGE decoding is illustrated in FIG. 6, in which a packet can be decoded from 4 encoded blocks. The receiver starts decoding when two blocks are received (step a). As noted, above, each row of the coefficient matrix represents the way an encoded block was enclded. The two clean blocks are shown in FIG. 6(a) as two rows of the decoding coefficient matrix. AGE focuses on the 2×2 submatrix shown within the dashed square (instead of the full 2×4 matrix), and tries to convert the submatrix highlighted by the dashed square into an identity matrix by switching the first two rows (step b: triangularization) and replacing the first row with the XOR of the first two rows (step c: backward substitution).

When the third block is delivered from the radio to the microcontroller (in the third SPI event of FIG. 5B), the receiver inserts it to the third row (step d) and performs triangularization (step e). However, this step fails and thus the receiver stores the second block as a temporal block for future use without performing backward substitution (step f). When the last block is received, the original data can be decoded by eliminating all "1" values in the last row by triangularization (step h) and in the last column by backward substitution (step i).

With the AGE algorithm, both triangularization and backward substitution are nearly completed prior to the reception of the last block. The receiver only processes the coefficient matrix for the last block to recover the original packet. The decoding latency is thus significantly reduced from 1.2 ms to 0.4 ms and the receiver can promptly send a feedback to the transmitter within an ACK waiting interval.

2.3 DLT Networking

Traditional link quality metrics for packet routing, e.g., ETX, are not suitable for distanceless transmissions, because they evaluate links based on the packet reception statistics. DLT transmits fine-grained rateless blocks. The number of blocks contained by each frame is dynamically adjusted and the frame length is variable for different transmissions. We therefore propose a tailored metric to evaluate the per-link transmission quality, which can be seamlessly integrated into CTP for a network-wide distanceless data collection. We further propose a routing protocol to optimize the performance in low duty-cycled sparse sensor networks with limited network diversity.

2.3.1 Expected Distanceless Transmission Time

Block Reception Rate (BLRR). BLRR directly describes the channel loss in block-level transmissions. It is the ratio between the clean blocks received by the receiver and the total blocks sent by the transmitter. The BLRR for a given block size (e.g., $L_b$), denoted as BLRRb, can be measured directly based on data transmissions. The receiver inserts a payload of one byte in its feedback message. For an ACK, the one-byte payload presents the number of received clean blocks; otherwise, it refers to the number of missing blocks. Based on the information, the transmitter can calculate its BLRR after each transmission. To minimize the measurement jitter, we apply a weighted moving average to obtain a relatively stable BLRR.

$$BLRR_b = \alpha * BLRR^{new}_b + (1-\alpha) * BLRR^{old}_b \quad (1)$$

where $BLRR^{new}_b$ denotes the value of $BLRR_b$ which has just been derived, $BLRR^{old}_b$ denotes the previous value of $BLRR_b$, and a is a weighting factor. The setting of α is experimentally determined according to the variation of wireless channels. In our deployment, a weighting factor of 0.92 provides the best performance, which reveals that the channel in our deployment field is highly dynamic.

BLRR cannot differentiate two links if their block sizes are not the same. For instance, on a link of high byte error rate, if a large block size is used, the BLRR is low; otherwise, a small block size results in a higher BLRR. Simple comparison between two BLRRs of different block sizes cannot represent the actual channel condition. To best accommodate to different channel conditions, however, we must adjust block size dynamically (Section 2.4 describes the block size adaptation algorithm) used in DLT. Therefore, we propose Expected Distanceless Transmission Time (EDTT) to evaluate the distanceless link transmissions.

EDTT averages the BLRRs of different block sizes. We denote the length of an original data packet as $L_{data}$. With rateless transmissions, the data packet is divided into $L_{data}/L_b$ blocks to generate unlimited rateless blocks. To decode the packet, receivers need $(L_{data}/L_b)*(m_b/k_b)/BLRR_b$ rateless blocks, where $k_b/m_b$ is the decoding efficiency of LT code for $k_b$ original blocks. For each rateless block, we add one-byte CRC and thus $(L_b+1)*8$ bits need to be transmitted. The time needed to complete the transmission of all those blocks, called Distanceless Transmission Time (DTT), can be calculated as:

$$DTT_b = \frac{L_{data} * m_b * (L_b + 1) * 8}{L_b * k_b * BLRR_b * R}$$

where R is the transmission bit rate. If we denote the set of all possible block sizes as L, EDTT can be calculated as:

$$EDTT = \sum_{b \in L} P_b * DTT_b$$

where $P_b$ is the probability of using the b-th block size and $DTT_b$ is its transmission time. The embodiment takes $P_b$ as the usage frequency of each block size in last M transmissions. In our experiments presented below, M is set to 100. If one block size is not used in the past M transmissions, its usage frequency is equal to 0. Based on Equation (2) and (3), EDTT is calculated for each link by measuring its BLRR.

2.3.2 Integrating DLT with CTP.

EDTT makes it possible for the embodiment to integrate DLT with the de facto routing protocol in wireless sensor networks, Collection Tree Protocol (CTP), with the minimal modification to the existing protocol stack. We replace ETX in the CTP implementation in TinyOS by EDTT. Each node selects the path with the minimum cumulative EDTT to the sink to transmit packets. The per-link EDTT value is included in each transmitted frame. If a node receives a packet yielding a lower cumulative EDTT value to the sink, it updates its routing table. EDTT of an individual link is updated by data transmissions and proactive probes. Beacon packets are transmitted periodically with a pre-defined payload. The beacon transmission period is adjusted according to the Trickle algorithm [27]. Upon receiving a beacon, the erroneous bits are known and we thus can calculate the BLRR for each block size. By doing so, the embodiment obtains the EDTT for all block sizes using one beacon.

2.3.3 Low Duty-Cycled Networks

In wireless sensor networks, nodes are usually duty-cycled to prolong the network lifetime. To provide a general and comprehensive design for data collection in environmental monitoring applications, the embodiment preferably has a low duty-cycled mode.

Low-power listening (LPL) has been widely adopted to schedule two asynchronous transceivers in low duty-cycled sensor networks. With the default implementation of LPL in TinyOS, BoX-MAC [36], the transmitter sends a long preamble of data packets. When a node wakes up, it first checks the channel for a short duration. It attempts to receive the packet if the channel is sensed to be busy; otherwise, it goes back to sleep again. The embodiment uses LPL to provide a duty-cycled sensor network. In variations of the embodiment, other types of duty cycling schemes, e.g., receiver-initiated A-MAC [13], are used.

LPL has been integrated into many existing routing protocols, like CTP and ORW. In CTP with LPL enabled, nodes transmit a long preamble until their target receiver wakes up. ORW reduces the latency and energy consumption by enabling opportunistic routing of the first woken forwarder. Nodes check whether they can make progress for a packet delivery by considering both their cumulative ETX distance to the sink and the number of their potential forwarders. More potential forwarders imply that the per-hop transmission latency will be low.

The existing protocols, however, mainly focus on dense sensor networks with rich network diversity. By taking into account the unique features of sparse sensor networks (e.g., extremely lossy links and low network diversity), the embodiment employs several optimization schemes to better incorporate the distanceless transmissions in low duty-cycled mode. Due to the low network diversity in sparse sensor networks, the embodiment makes full usage of each potential transmission opportunity. Nodes with DLT maintain an EDTT parameter for each potential receiver and choose the minimum cumulative EDTT as their EDTT. When a node wakes up and hears a preamble, it decodes the header of a frame and verifies whether it should forward the packet. For verification, the node compares its cumulative EDTT with the transmitter's, which is contained in the frame header of each transmission. If its cumulative EDTT is smaller than the transmitter's, it becomes a forwarder for that transmitter.

In the embodiment, instead of repeating the same data packet in the preamble, nodes transmit a stream of rateless frames as a preamble. Each frame contains different rateless blocks such that diverse frames are continuously pumped out. Potential forwarders can recover the data packet by receiving sufficient rateless blocks. For multiple receivers, the optimal frame length is different. The length of preamble frames is configured according to the channel condition to the nearest forwarder since it normally requires the least amount of rateless blocks. When a receiver far away from the transmitter wakes up first and verifies that it is eligible to relay this packet, it sends a NAK with the number of missing blocks. Upon receiving the NAK, the transmitter adjusts the frame length and transmits proper number of rateless blocks to adapt to the wireless channel condition of the respective forwarder. The number of blocks contained in next frame is adjusted based on both the number of clean blocks already received by the forwarder (Nrec) and the channel quality, as expressed in the following:

$$N_b = \frac{(N_{data} - N_{rec}) * m_b}{BLRR_b * k_b}$$

In sparse sensor networks, each node only possesses a few potential forwarders. It is rare that multiple forwarders simultaneously succeed in decoding and their feedbacks collide. To handle this problem, the transmitter transmits frames with a default frame length after the ACK waiting timer expires. If a node did not receive any block, it does not reply with an ACK or a NAK. If it received some blocks (but not all blocks) it cannot decode them successfully, and replies to the sender with a NAK. If it received all of them, it replies with an ACK. Optionally, the receiver may only transmit the ACK or NAK with a probability of ½; this has the advantage tha the probability of its ACK or NAK colliding with that from other receivers is small.

2.4 Implementation Details

The embodiment was implemented using the TinyOS framework. Here we explain the architecture of the implementation and the techniques used in the implementation.

2.4.1 DLT Architecture.

The architecture of the nodes is explained above with reference to FIG. 2. The four major modules (units 12, 13, 17 and 18) were implemented in a manner compatible with the existing 802.15.4 networking stack, with the minimal modifications to current protocol components in TinyOS.

To transmit a data packet, the routing unit 12 adds a header before the application payload, including the EDTT, source address and sequence number. The processed data packet is then delivered to the logical link control unit 13 to generate rateless blocks and assemble frames. The optimization of transmission parameters, e.g., block size and frame length, are also performed in the logical link control unit 13. Frames are finally passed to the existing MAC layer 14 for transmissions using LPL and CSMA/CA.

For receiving, the PHY layer 15 loads the received bytes in a buffer after detecting a preamble. The fast decoding module retrieves blocks from the buffer and passes them to the logical link control to start decoding. Nodes maintain a forwarding cost for each neighbor in the routing module. When a decoded packet is passed to the routing unit 12, the node either relays the packet to the CTP parent or the first woken neighbor with a smaller forwarding cost. The link quality metric is updated periodically with the default mechanism in the network layer.

2.4.2 Frame Format.

Figure 7:
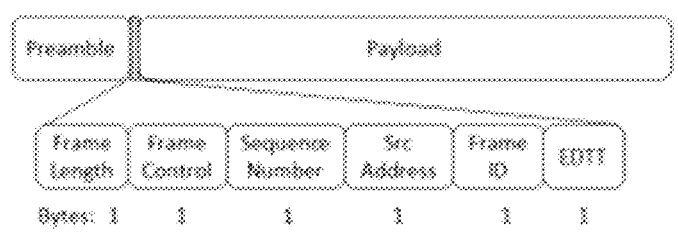
FIG. 7 shows the frame format used by the node of FIG. 3.

The frame format in DLT is depicted in FIG. 7. "Frame Length" is the number of bytes contained in the frame. "Frame Control" contains control information, e.g., two bits in this field indicate the frame type; one bit describes whether an ACK is required; and the rest are reserved for future extension. "Sequence Number" is the original data packet index and "Src Address" is the ID of the node which generates this data packet. Different frames encoded from the same data packet are identified by their "Frame ID". The ID is set to 1 for the first frame and is increased gradually for the following frames. The EDTT of the transmitter is used to verify forwarding before the decoding of MAC payload. If the node is not a forwarder to the current transmission, it will discard the received frame without decoding.

2.4.3 Block Size Adaptation.

Given the channel condition, different block sizes $L_b$ may result in different BLRRs. A small block size can preserve correct bytes with higher granularity, whereas it requires more CRC overhead. In the embodiment, the block size in each frame is adapted dynamically according to the current channel condition. We propose a simple heuristic algorithm to dynamically adapt the block size. Here "block size" means the number of bytes a block has, rather than the number of blocks which are generated. Once the block size has beet set, the transmission uses this block size until to packet is decoded. After the packet is decodes, the transmitter can use a different block size to transmit the next packet. The embodiment adapts the block size according to the variation of BLRR. When the BLRR reaches an upper bound $\tau_h$, it indicates that the number of error bytes in the received frame is low and we can increase the block size to reduce the CRC overhead. When the BLRR decreases to a lower bound $\tau_l$, there are too many erroneous blocks and the block size needs to be reduced. In our implementation, $\tau_h$ and $\tau_l$ are set to 91% and 72% respectively, and three levels of block size, i.e., 4, 8 and 16 bytes, are used. The block size of a frame is indicated by 2 bits in its "Frame Control" field of the MAC header.

2.4.4 Predictable Encoding Coefficient Matrix.

To reduce the transmission overhead, the embodiment does not transmit the random number generator seed used for encoding and decoding along with the data packet. Instead, a fixed seed is used. To generate the coefficient matrix l for decoding, the corresponding row of one received block can be identified by "Frame ID" and the offset of the block in that frame. If the CRC checking of a block fails, it will be discarded and its corresponding row will be deleted from l. If the transmitter does not receive a feedback from any receivers in an ACK waiting duration, it transmits another frame with the same number of rateless blocks in the previous frame. The new frame contains the next piece of encoded blocks and an increased frame ID. It can thus bring novel information to the receiver in case that the feedback of the previous frame was lost. When a node receives a frame ID increased by j, where j>2, it identifies the row of the i-th block in this frame as $N_{blk}$+bxj+i, where $N_{blk}$ is the number of blocks in the last correctly received frame and b is the number of blocks contained in the current frame.

2.4.5 LT Code on Sensor Motes.

Table 1 tabulates the decoding efficiency, decoding time, and memory occupancy measured on TinyNode (TI MSP430 microcontroller) for different k values. The term "IGE" refers to Incremental Gaussian elimination, which is explained in [3].

TABLE 1

The performance of implemented LT code on TinyNode using the AGE decoding algorithm.

|  |  | Number of blocks | | |
| --- | --- | --- | --- | --- |
|  |  | 4 | 8 | 16 |
| Decoding time (ms) | GE | 0.9 | 2.4 | 10.1 |
|  | IGE | 0.5 | 0.8 | 3.4 |
|  | AGE | 0.4 | 0.4 | 1.4 |
| Overhead (blocks) | Robust Soliton | 2.99 | 6.03 | 10.87 |
|  | Synapse + GE | 1.81 | 1.96 | 1.83 |
|  | Synapse + AGE | 1.7 | 1.91 | 1.9 |
| RAM (kB) |  | 4.4 | 4.5 | 5.0 |

The results reveal that the proposed AGE algorithm can significantly reduce the decoding time without impacting the decoding efficiency. The decoding time is measured from the last block received until the decoding completed under parallel decoding and receiving.

To fully pipeline the frame receiving and decoding, the total decoding time should be less than the receiving time. However, the decoding time is 30.5 ms, which is much larger than the time (i.e., 8 ms) to transmit a packet of 76 bytes at 76.2 kb/s bit rate on TinyNode. To accelerate the decoding, we find that the random number generation used to reproduce the encoding coefficient matrix is time consuming in TinyOS. We trade RAM memory for encoding and decoding speed. Instead of generating the coefficient matrix every time a frame is received, the embodiment fixes the random number generator seed and stores the coefficient matrix in RAM. For a 64-byte frame of 8 original blocks, the embodiment saves a matrix of 160 rows for 160 encoded blocks (20 times larger than the number of original blocks). It is sufficient for some extremely lossy links with a block error rate around 94% (150/160), but only occupies 160 bytes of RAM. By doing so, the embodiment reduces the decoding time from 31 ms to 2.4 ms.

With the embodiment's AGE algorithm, the decoding time can be finally reduced to 0.4 ms. From Table 1, we also see that the decoding overhead of our AGE algorithm is the same as the traditional GE algorithms. Furthermore, the RAM cost shown in Table 1 is the footprint of our implementation of DLT including specifications of all protocol layers but not just AGE decoding. The memory cost is well controlled and can be supported by current sensor motes, e.g., TinyNode and TelosB, which are composed of TI MSP430 microcontroller possessing a RAM memory of 10 KB.

Evaluation

We evaluated the embodiment and compared it with other data collection protocols on a wind measurement sensor network.

3.1 Deployment and Experimental Setting

In the experiment, 12 wind sensors were installed in Marina Reservoir of Singapore (a typical urban water field of 2.5 km*3.0 km), to measure the wind distribution on the water surface. The sensor locations had been optimized by a sensor placement approach [9]. The average line of sight distance between two sensors in the network is 720 m. The maximum distance is 1000 m and the minimum distance is 300 m. Some of the sensors were installed on land, others were floating on the water surface. The electronics was in a weatherproof box with an omnidirectional antenna extending outside the box. The wind sensors were labelled W01 to W12, of which the sink was W06.

The wind monitor model 05305L of R.M. YOUNG was used to measure the wind direction and speed. The OS5000 3-axis digital compass from OceanServer provided the direction offset of the floating platform. The embodiment, which was based on the TinyNode technique, retrieved the sensor readings from the anemometer via its analog-to-digital converter and a multi-hop network was built using 12 TinyNode sensor motes to collect sensor data. A data logger was used to record the system debugging information, including data generation, packet transmission and receiving. Solar panels were used to harvest energy, which was stored in a rechargeable battery and further used to power all electronic devices. The energy harvested by the solar panel provided a power budget of −55.2 Wh/day, where the wind sensor and data logger consumed −51.9 Wh/day, leaving −3 Wh/day to the communication module. The embodiment employed duty-cycled DLT with such a limited power budget.

Besides energy efficiency, the data collection was required to be reliable and fast. The sensor readings were processed to generate the distribution of wind stress on the water surface. Data loss from any sensor nodes will impair the accuracy of the derived wind distribution. Furthermore, the wind distribution is used as input to study the water hydrodynamics and water quality in the entire reservoir with a 3-D limnological model [9]. If problems arise, special physical or chemical treatments were taken, e.g., draining the water through a barrage, starting the bubble-plume system to improve water mixing, or adding algaecide to control algal blooms. As the calculation of ecological model was time consuming (about 2-3 min), to enable timely treatment, the data collection system was required to provide real-time data monitoring, at least faster than the ecological calculation.

In our experiment, one wind data sample was described by 4 bytes (2 bytes for wind direction and 2 bytes for wind speed). Each sample was associated with a time stamp of 4 bytes. Wind sensors made a measurement every 10 s and sent 6 samples together to the sink every minute. With an 8-byte network layer header (same as CTP) and an 8-byte field describing the status of physical devices, the data link layer payload was 64 bytes. The total packet length was 76 bytes, including a 6-byte PHY layer header and a 6-byte frame header. The data link layer payload of 64 bytes was encoded into rateless blocks by LT code. The block size could be 4, 8 and 16 bytes, corresponding to 16, 8 and 4 original blocks in one data packet.

3.2 Methodology

We compared the performance of DLT with the following benchmark protocols.

CTP [17] is the de facto routing protocol for sensor networks. We ran CTP with BoX-MAC [36], the default low-power listening MAC protocol in TinyOS. To transmit a data packet, the transmitter sends a long preamble until the target receiver wakes up. The preamble is a series of data packets separated by an ACK waiting interval.

ORW [24] is the most recent routing protocol designed for low duty-cycled sensor networks following the opportunistic principle. It uses Expected Duty Cycled wakeups (EDC) to control the size of forwarder set and adds a weight in EDC to reflect forwarding cost. The weight parameter is set to 0.1, the best setting reported in [24].

Seda [15] is a block-level link transmission method. It divides one packet into blocks, each of which is associated with a CRC and a sequence number. When a node receives a corrupted packet, it replies the transmitter with the sequence number of erroneous blocks and the transmitter retransmits those blocks. As Seda outperforms other Forward Error Correction (FEC) and Automatic Repeat-reQuest (ARQ) methods in sensor networks [15], we do not compare DLT with them individually. In this experiment, we integrate Seda with ORW (as ORW generally outperforms CTP) for the performance comparison.

The main task of the embodiment is to collect data in sparse sensor networks reliably and efficiently. We used the following 3 metrics for the performance evaluation.

Data yield is the ratio between the amount of data packets received at the sink and the total amount of data packets generated by all sensors in the network. In the experiments, packets may be lost when 1) buffer overflows due to network congestion, or 2) continuous failures after the maximum number of channel access (macMaxCSMABackoffs) or transmission attempts (macMaxFrameRetries). As the default setting in IEEE 802.15.4 standard, macMaxCSMABackoffs and macMaxFrameRetries are set to 4 and 3 respectively.

End-to-end latency is measured from the time when the original source node generates a data packet to the time when the packet is received by the sink. In our wind measurement sensor network, sensor nodes maintain a 2-packet buffer for each neighbor. A node must drop the oldest packets from one neighbor if more than 2 packets are in the respective buffer.

Energy efficiency is measured by duty cycle, i.e., the portion of time when the radio is on. Duty cycle is a good proxy of energy consumption for wireless sensors, since the two main energy-consuming components on sensor motes (i.e., microcontroller and radio) have similar work schedule and the radio consumes similar levels of energy while transmitting and receiving.

3.3 Results

We show the experimental results at both link level and network level. We first focus on the periodical data collection and consider another flexible traffic pattern later.

3.3.1 Single Link

Using the in-field measurements on several single links, we studied the performance of different link-transmission approaches and the proposed block size adaptation algorithm.

Table 2 presents in-field measurements for three link-level performance metrics (PRR, BRR and BER) measured at W04 and W06 when W01 is transmitting at different data rates. The pairs of W01-W04 and W01-W06 represent links with short (around 550 m) and long (around 1000 m) communication ranges, respectively. PRR and BRR are calculated based on all transmitted packets. BER is the byte error rate of all received packets, not including the lost packets.

TABLE 2

Performance (PRR, BRR and BER) of two links with different communication distances and data rates.

| Rate (kb/s) | W01 to W04 (550 m) | | | W01 to W06 (1000 m) | | |
| --- | --- | --- | --- | --- | --- | --- |
| | PRR | BRR | BER | PRR | BRR | BER |
| 76.2 | 0.25 | 0.46 | 0.07 | 0.04 | 0.15 | 0.11 |
| 1.2 | 0.43 | 0.61 | 0.05 | 0.09 | 0.23 | 0.07 |

In Table 2, the BRRs of all links are much higher than the relative PRRs, and the BER in the corrupted packets is low. The results confirm to our observation above that the bandwidth utilization in sparse sensor networks can be significantly improved and the long communication distance can also be achieved if we can efficiently enable byte-level transmissions. Although both PRR and BRR increase for the long-distance link to W06 when the bit rate is reduced, the highest bit rate (76.2 kb/s) still offers the largest throughput (PRR*Rate), which is probably due to the combined effect of interference and signal attenuation. We set the bit rate of all approaches to 76.2 kb/s during the experiments.

Block size adaptation. Table 3 presents the "goodput" achieved by different block sizes for the packet traces collected on two links. The goodput of a received frame with block size $L_b$ can be calculated as:

$$S_i = \frac{N_{cleanblk} * L_b}{N_{totalblk} * (L_b + 1)} * R$$

where R is the bit rate. $N_{cleanblk}$ and $N_{totalblk}$ represent the number of correctly received blocks and the total number of blocks in one packet, respectively. We calculated the goodput achieved by several fixed block sizes for each packet in the traces. The goodput of optimal adaptation is the average goodput calculated by the best block size of each packet.

TABLE 3

Goodput (kb/s) achieved by different block sizes

| | Block size | | | | |
| --- | --- | --- | --- | --- | --- |
| Link | 4 | 8 | 16 | Optimal | Adapt |
| W01 to W04 | 52.5 | 56.7 | 57.9 | 59.4 | 58.8 |
| W01 to W06 | 41.8 | 40.8 | 36.5 | 44.9 | 43.4 |

From Table 3, we see that one fixed block size is not sufficient for all links. For the short link from W01 to W04, a large block size is preferred; the link W01 to W06, which is of long communication distance, however, works best with a small block size due to more erroneous bytes in the traces. In addition, even for one single link, it is advantageous to adapt the block size according to the channel dynamics. The goodput achieved by the proposed adaptation algorithm in Table 3 demonstrates that the embodiment's heuristic algorithm captures the channel variation and approaches the optimal solution. We will show next that the 1-byte CRC overhead of each block is much smaller than the substantial gain derived from rateless transmissions and block size adaptation.

Figure 8:
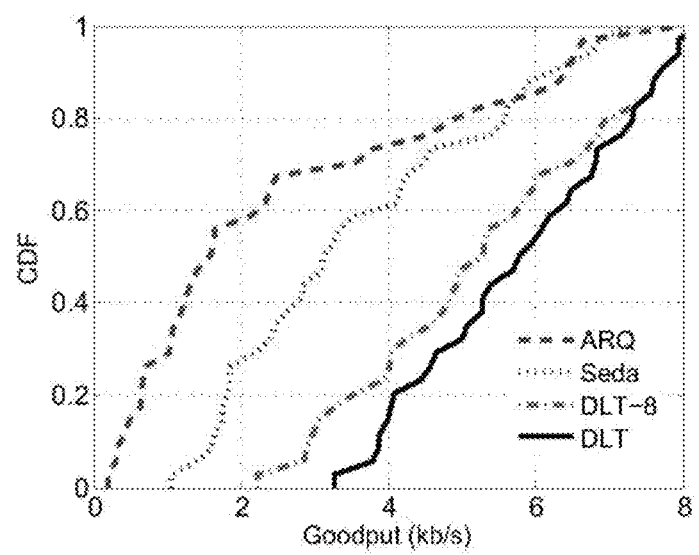
FIG. 8 shows experimental results for the goodput of four signal transmission techniques, including an embodiment of the present invention.

Goodput on single link. FIG. 8 depicts the link-level goodput as a cumulative distribution function (CDF) of goodput achieved by ARQ, Seda and the embodiment (labelled as DLT) on the long-distance link from W01 to W06.

Here the x-axis measures the goodput, and the y-axis shows the percentage of the population (number of links). We measure the goodput that all approaches can achieve to transmit 100 packet traces, considering CRC overhead, packet retransmission, CSMA-based multiple access overhead and ACK loss. Seda and DLT-8 use a fixed block size of 8 bytes, and DLT enables the proposed block size adaptation algorithm. The results in FIG. 8 show that Seda improves the average goodput of ARQ by 1.4× via block-level retransmissions and DLT achieves a goodput improvement of 2.1× over ARQ through distanceless transmissions. As can be seen, for 80% of the population the embodiment has a goodput of greater than 7 kbps. If the proposed block size adaptation algorithm is enabled, the goodput gain could be further increased to 2.3×. Although Seda provides block level transmissions, DLT possesses two unique advantages. First, the embodiment proactively adapts to the wireless channels by transmitting proper number of encoded blocks before each transmission; however, Seda can only recover the corrupted packet by passively retransmitting the erroneous blocks. Second, the performance of Seda highly relies on the correct reception of feedback packets. In case of ACK loss, Seda has to retransmit the data packet, whereas the embodiment only needs to transmit more rateless blocks. New blocks can be combined with the previous blocks to recover the original data. In our deployment, 10% ACK loss is observed. The link asymmetry confirms to the experiments on IEEE 802.15.4 links [41].

3.3.2 Network Performance

Figure 9:
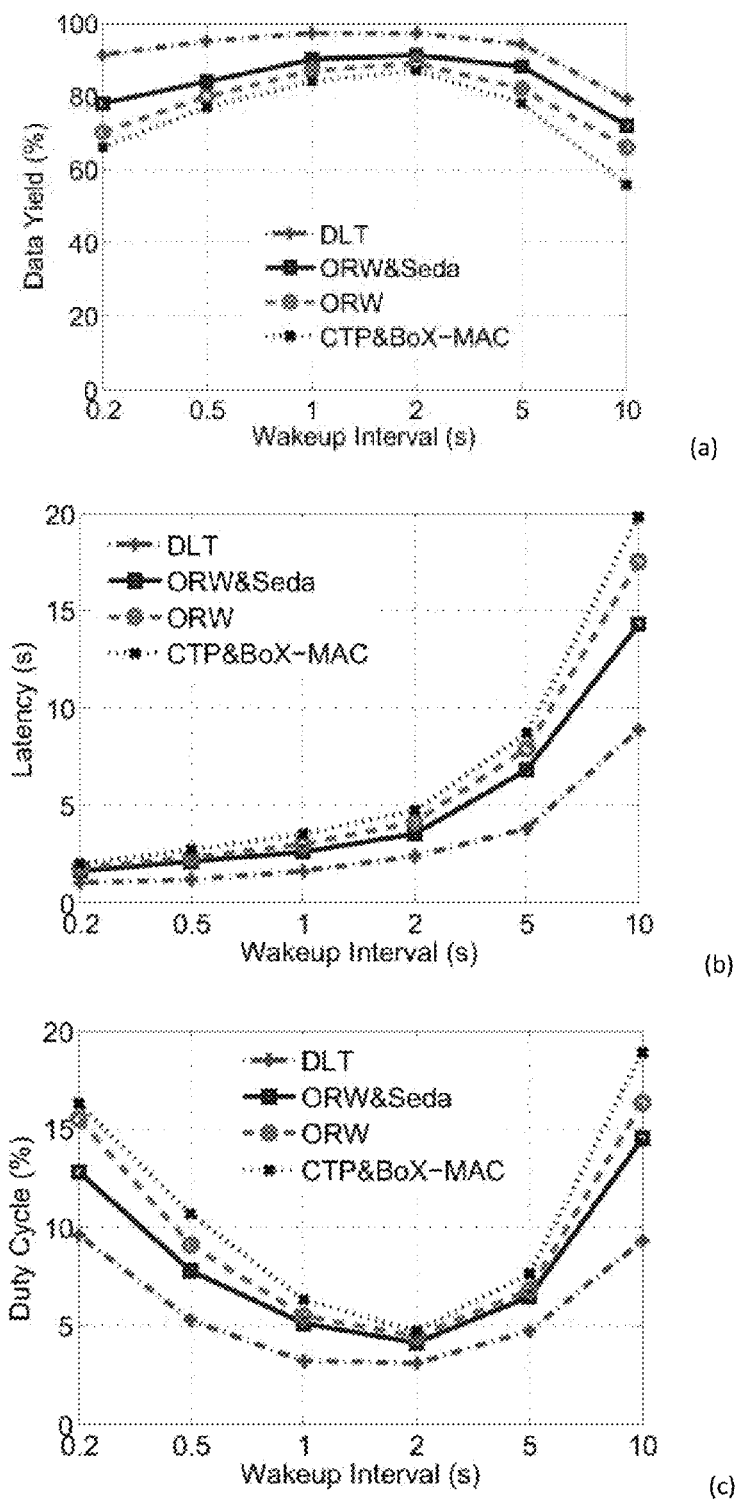
FIG. 9, which is composed of FIGS. 9(*a*)-(*c*), shows three performance measures for four signal transmission techniques, including an embodiment of the invention, for various wakeup intervals.

This section reports the results of running the benchmark approaches one by one on the deployed sensor network. Each experiment lasted for 2 hours. In our application, each node sent its data to the sink (W06) every minute. The sink was always in active mode and was connected to internet directly. We evaluated the performance of all approaches with different wakeup intervals, and the results are shown in FIG. 9. All the results presented in FIG. 9 are based on the packet generation rate of 1 min. In low duty-cycled sensor networks, wakeup interval is a crucial parameter to achieve the best network performance given a fixed traffic load.

The results reveal that the embodiment outperforms the other approaches for all wakeup intervals and it can provide high performance for a large range of wakeup intervals. On average, the embodiment achieved substantial performance improvement over CTP, ORW, and ORW-Seda. In particular, DLT increases the data yield of CTP, ORW and ORW-Seda by 26%, 15% and 10%, respectively. It reduced the packet latency of CTP, ORW and ORW-Seda by 55%, 49% and 44%. The embodiment also improved the energy efficiency of CTP, ORW and ORW-Seda by 41%, 31% and 27%.

FIG. 9(a) shows the data yield of different protocols under various wakeup intervals. Compared with benchmark protocols, the embodiment produces less traffic loads in the network, since it shortens the preamble transmission by utilizing the opportunistic forwarding from distant neighbors and accelerates the data transmissions by better adapting to the dynamic wireless channels. It encounters less collision and congestion, and thus provides higher data yield.

When the wakeup interval is small, it is highly possible that multiple nodes are awake at the same time. Data yields are low due to the high probability of collisions. Many packets are dropped after the maximum number of transmission attempts. Especially for sparse sensor networks, traditional communication schemes have to transmit a packet many times when the channel is lossy. The transmission of one data packet may be longer than one wakeup interval. As a result, it will likely collide with the transmissions from other neighbors in the next wakeup interval. The embodiment mitigates such problems since it shortens the link transmissions and reduces the probability of lengthy packet transmissions. As the wakeup interval increases, the data yield of the embodiment becomes stable. Compared with the other approaches, the embodiment provides high performance for a wider range of wakeup intervals. For large wakeup intervals, data yields decrease due to traffic congestion. Long preambles occupy the channel for a long duration, which reduces the transmission chance of other nodes. Moreover, they are susceptible to collisions.

FIG. 9(b) presents the average end-to-end latency of data packets. The latency augments as the wakeup interval increases, as long preamble needs to be transmitted before the forwarder wakes up. However, compared with the benchmark protocols, the embodiment has a much slower increasing speed, since it achieves short data frame transmissions and benefits more from the distant forwarders enabled by distanceless transmissions.

When the wakeup interval is large, the latency of the embodiment is even less than one wakeup interval. In the multi-hop network, latency is reduced by opportunistic forwarding. The nodes close to the sink forward the packets from other nodes if they wake up earlier than the default forwarder, e.g., the node selected by CTP. Moreover, even without opportunistic forwarding, it is possible that the forwarders along a packet delivery path wake up sequentially. Since the distanceless link transmission of DLT is short and optimized, the packet has a high probability to be relayed sequentially without missing the wakeup of any forwarders. The latency difference between CTP and ORW is small, because opportunistic forwarding is rare if long-distance links are not utilized.

FIG. 9(c) depicts the duty cycles achieved by different protocols. Lower duty cycle indicates higher energy efficiency. The embodiment can achieve the best energy efficiency for most wakeup intervals. When a small wakeup interval is used, the energy consumption is high due to more collisions and more CSMA-based multiple access overhead. The embodiment transmits the packet with much less attempts attributed to its optimal utilization of channel bandwidth. For a large wakeup interval, more energy is consumed by the transmission of long preamble packets. Since the embodiment leverages better the distant forwarders which may wake up earlier than the default forwarder, it enables shorter preamble transmissions and thus smaller probability of collisions.

3.3.3 Performance Per Node

Figure 10:
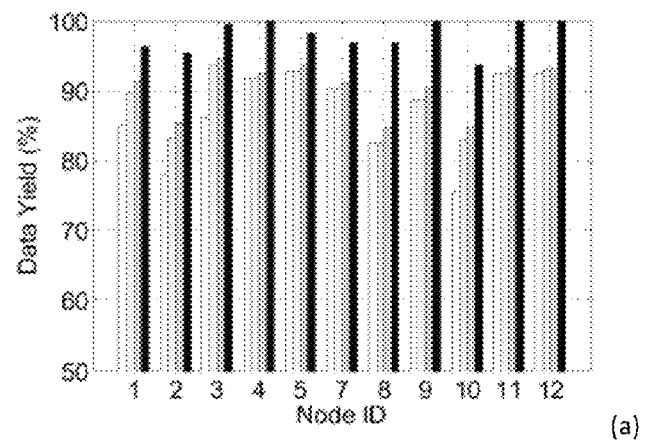
FIG. 10, which is composed of FIG. 10(*a*)-(*c*), shows three measures of overall performance per note in a network of twelve nodes.
Figure 10:
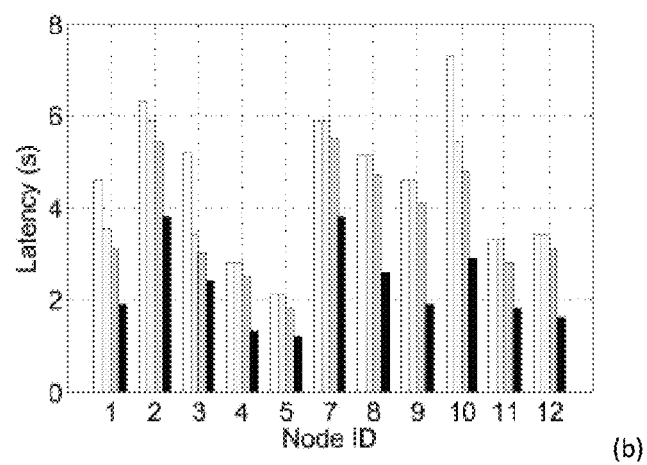
Figure 10:
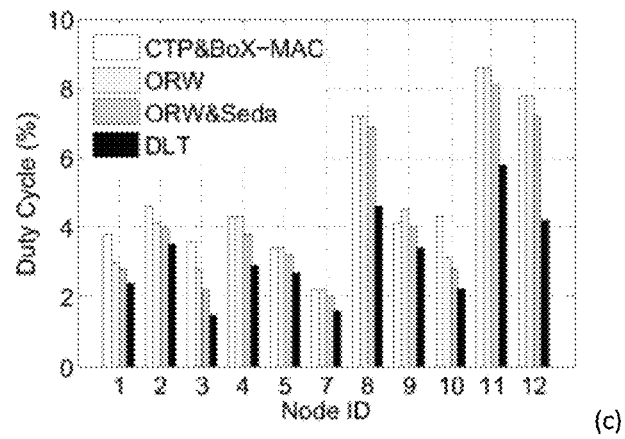

The experiments in this section were conducted with a wakeup interval of 2 s which enables the best performance of CTP and ORW. FIG. 10 demonstrates the performance of each node in the network except the sink, which has direct internet access. From the results, we see that the embodiment can improve the reliability and efficiency of all the nodes regardless of their location in the network. Compared with the other approaches, the gain of the embodiment mainly comes from two parts: better utilizing wireless channel bandwidth and fully exploiting the enriched network diversity enabled by distanceless transmissions.

The data yield of a node is the ratio between the amount of data packets received by the sink from that node and the total amount of data packets generated by that node. Relaying packets are not considered in the per-node data yield. As shown in FIG. 10(a), the data yield of CTP for some distant nodes, e.g., W02 and W10, is quite low, because they only possess one forwarder and their data packets have to pass through a long path composed of lossy links. ORW and ORW-Seda improve the data yield by employing multiple forwarders and the embodiment can achieve further improvement by proactive adaptation to the wireless channels of all potential forwarders including the distant ones.

FIG. 10(b) examines the average latency of packets transmitted from different nodes. Similar to data yield, packet latency of the nodes far away from the sink is large since the packets need to pass through a long path to reach the sink. The embodiment can accelerate this process by best leveraging distant receivers over extremely lossy links. For the one-hop neighbors of the sink (i.e., the nodes possessing a direct connection with the sink), the embodiment reduces their packet delivery latency by the efficient distanceless transmissions. The latency of W11 and W12 is slightly higher than that of W05, as their packets may be delayed when they are relaying the traffic from other nodes.

FIG. 10(c) shows the duty cycle of each node with different protocols. The energy consumption of some relaying nodes, like W08, W11 and W12, is high since they need to transmit both their own packets and the relayed packets for other nodes. The embodiment can improve the energy efficiency of these nodes by its elaborate link layer design to achieve reliable transmission of long communication distance. For instance, when W08 is transmitting to W11, if W06 is receiving data from W12 at the same time, the data transmission between W08 and W11 will be impaired by the ACK packet from W06 to W12. Attributable to its block-level distanceless transmissions, the embodiment can tolerate such interference by further transmitting a small number of encoded blocks.

3.3.4 Overhead

Figure 11:
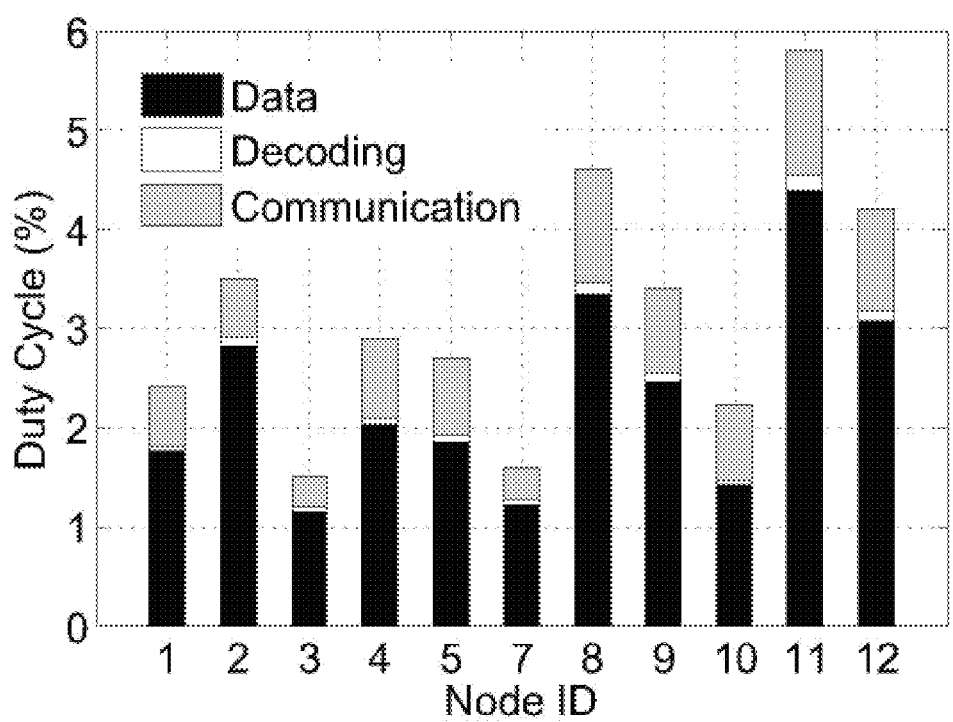
FIG. 11 shows the overhead breakdown of the nodes of FIG. 10.

FIG. 11 presents the overhead of each node of the embodiment. It separates the decoding overhead and communication overhead from the data transmissions. The communication overhead includes the time spent on ACK transmissions and CSMA channel access. The results show that the embodiment spends most of its active time for data transmissions. The decoding overhead is negligible compared with the data transmission or communication overhead. The decoding time of the embodiment is about 0.4 ms (for 8 original blocks) which is much smaller than the duration of data transmission (8 ms for a data packet of 8 original blocks). The small MAC header in the embodiment imposes negligible overhead. However, in sparse sensor networks, due to the impact of surrounding buildings, the hidden terminal problem is more severe than that of dense sensor networks, which increases the communication overhead. The embodiment minimizes the communication overhead by increasing the probability of successful transmission using distanceless transmissions.

3.3.5 Robustness

Figure 12:
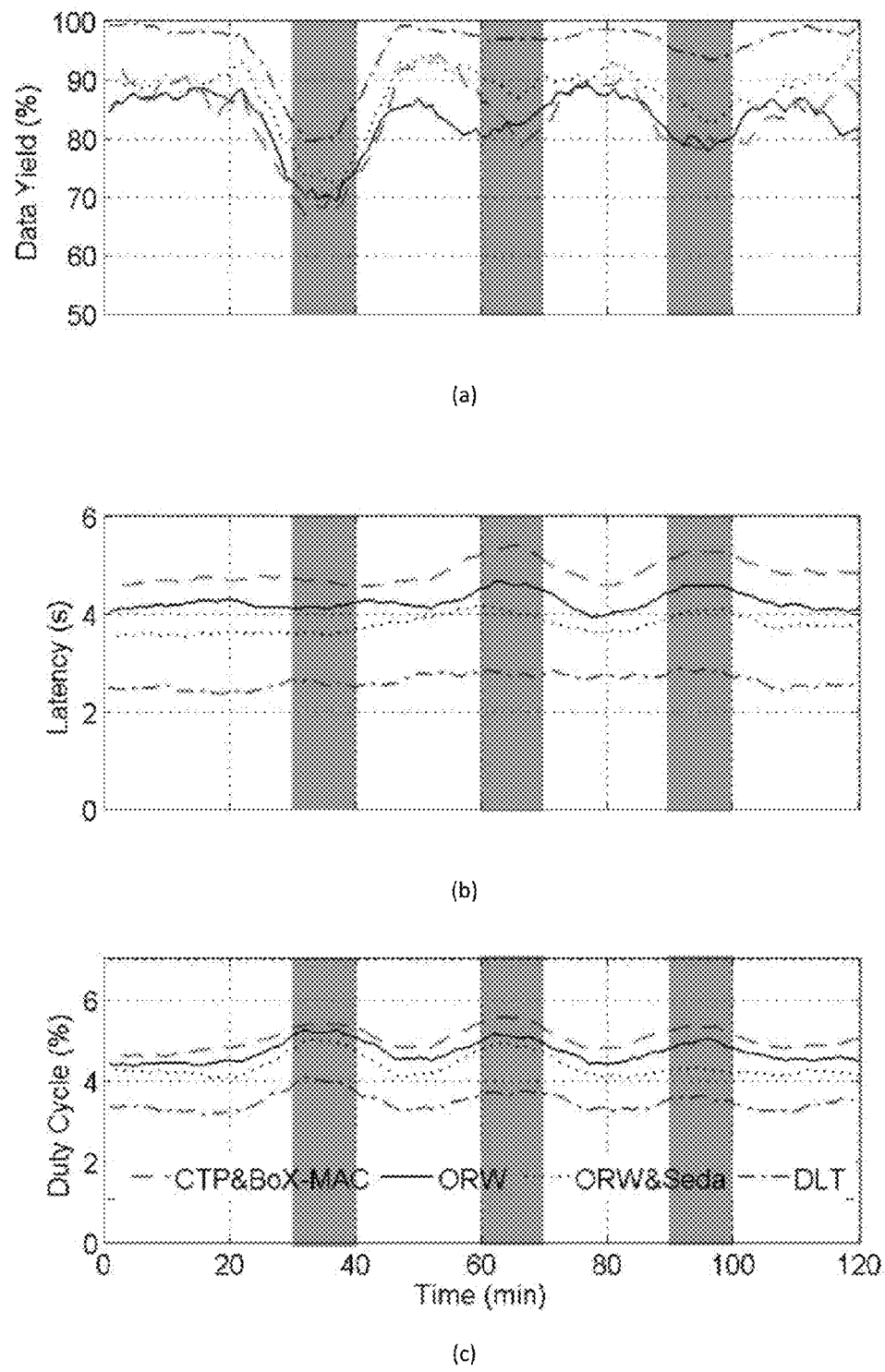
FIG. 12, which is composed of FIG. 12(*a*)-(*c*), illustrates the performance under outage of four signal transmission techniques, including one used by the embodiment.

We examine the robustness of each approach by inserting outages in the network. Every 30 min in a 120-min experiment, we disable a randomly chosen node for 10 min. To compare the performance of all approaches, the sequence of the selected nodes is the same for the experiments of all approaches. FIG. 12 demonstrates the capacity of each approach adapting to the outages. FIG. 12(a) indicates the data yield, FIG. 12(b) indicates the latency, and FIG. 12(b) indicates the duty cycle. The outages are shown by the grey shadow. Each time point in FIG. 12 is the smoothed data result with a 15-min moving average window. During the first outage from 30 min to 40 min, W11 is disabled. The data yield of all approaches decreases, since W11 connects the subnetwork, consisting of W02, W07 and W08, to the sink W06. The energy consumption of all approaches is increased because W08 spends much energy to send data to W11.

In the last two outages, we can see from FIG. 12(a) that the data yield of the embodiment is reduced slightly whereas the performance of the other approaches is degraded sharply. In those two cases, the embodiment can fully leverage the long-distance links to bypass the disabled nodes; however, the other approaches react slowly and cannot fully utilize the wireless channels based on packet-level retransmissions or simple block-level retransmissions.

3.3.6 Traffic Patterns

In the above experiments, all nodes in the network send their data to the sink periodically. Besides such a pre-fixed traffic pattern, we also conducted some experiments to evaluate the performance of the embodiment for event-driven monitoring. That is, sensor nodes only send their data back to the sink when an interesting event occurs. We assume that the event effect is limited (e.g., a sudden change of wind direction) and can only be detected by one or two sensors. To evaluate the performance of DLT in such a flexible traffic pattern, each node in the deployed sensor network generates a packet randomly and independently in a given period. The wakeup interval of each node is set to 2 s.

Table 4 presents the performance of the embodiment for different Event Generation Rates (EGR), which is the average number of events generated by each node every minute. For each EGR, we measure the performance of the embodiment in an experiment of 2 hours.

TABLE 4

| EGR (per min) | Performance | | |
| --- | --- | --- | --- |
| | Yield | Latency | Energy consumption |
| 0.1 | 99.4% | 1.7 s | 0.65% |
| 0.5 | 9.4% | 1.7 s | 1.2% |
| 1 | 99.3% | 1.9 s | 2.7% |
| 2 | 96.6% | 2.8 s | 6.5% |
| 5 | 75.3% | 7.9 s | 26.7% |

From the experimental results in Table 4, we see that the embodiment can reliably send the event information to the sink in short time with small energy consumption for most EGRs. The reliability of data delivery is high for all EGRs lower than 2/min. When the EGR is 1/min, the performance of the embodiment is even better than the periodical data collection pattern. As the events generated by all nodes are independent in the event-driven traffic pattern, fewer nodes transmit at the same time, and the probability of collision and congestion is smaller than the periodical data collection pattern. When the EGR is 5/min, more collisions and congestions are caused by the heavy traffic. As a result, the reliability becomes lower; besides, the latency and energy consumption increase.

4 Related works, or Literature Review

In the last decade, a large number of sensor networks [1, 7, 21, 22, 23, 25, 28. 40] have been deployed for various applications, such as shooter detection, agriculture, healthcare and building automation. Besides, many large scale systems with hundreds of nodes [14, 20, 29, 33] have been developed, like multi-target tracking, military surveillance, temperature measurement and forest monitoring. TinyNode has been used in many projects for environmental monitoring, such as SensorScope [2] and Per-maSense [42]. All the above systems are, however, densely deployed at a scale which requires a large number of sensors and heavy maintenance due to network failures or environment dynamics [32]. The only deployment of sparse sensor networks, to the best of our knowledge, is a system of 9 Fleck-3 monitoring the salinity level of underground water with a mean communication distance of 800 m [26]. While it is a practical deployment, its delivery rate is low, about 64%.

4.1 Rateless Codes.

Strider [19] and Spinal code [38] are the most recent rateless codes designed for Gaussian channels; they nevertheless cannot be implemented on low-power wireless devices due to the high computational complexity. The digital fountain approach conception is first introduced in [5]. LT code [35] enables rateless transmission of encoded blocks by XOR operations and an elegant design of the coding scheme. It is used for remote reprogramming in sensor networks [39] at packet-level. LT-W [34] improves the decoding efficiency by Wiedemann Solver, whereas it is difficult to parallelize. MT-Deluge [16] employs multiple threads in TinyOS to provide concurrent operations of coding and reception. RTOC [43] adopts Online code to improve transmission reliability. The performance of online code is highly determined by parameter tuning and the evaluation in [43] is only based on simulations.

4.2 Partial Packet Recovery.

FEC approaches and hybrid ARQ can harness the correct bits in corrupted packets, e.g., ReedSolomon code used in ZipTx [30] to recover partial packets in WLANs. However, the existing approaches mainly focus on the error correction over well-established links and require accurate channel estimation to gauge proper redundancy to compensate for the bit error, which is difficult in sparse sensor networks. Even worse, if sensor nodes are duty-cycled, it is more challenging to achieve accurate channel estimation. DLT automatically approaches the capacity of different links. The block-level data link protocol, Seda [15], is not efficient because it needs to retransmit the exact erroneous blocks and cannot add protection before transmissions. SpaC [10] combines multiple corrupted packets to recover the original data, whereas it does not proactively adapt to channel loss.

4.3 Routing in Sensor Networks.

Dozer [4] and Koala [37] collect sensor data through TDMA-based scheduling on a tree topology for delay-insensitive applications. They, however, are not suitable for sparse sensor networks with dynamic transmission times. DSF [18] improves the reliability and latency of data forwarding by transmitting to multiple forwarding nodes. CBF [6] builds a forwarder cluster to enable opportunistic routing in sensor networks. ORW [24] incorporates opportunistic routing in low duty-cycle sensor networks to reduce latency and energy consumption. DOF [31] finds the duplicate problem is severe in ORW when the traffic load is high. ORLP [12] extends ORW to low-power IPv6 networks.

REFERENCES

The disclosure of the following references is incorporated in its entirety.

[1] Y. Agarwal, B. Balaji, S. Dutta, R. K. Gupta, and T. Weng. Duty-cycling buildings aggressively: The next frontier in hvac control. In ACM/IEE IPSN, 2011.

[2] G. Barrenetxea, F. Ingelrest, G. Schaefer, and M. Vetterli. The hitchhiker's guide to successful wireless sensor network deployments. In ACM SenSys, 2008.

[3] V. Bioglio, M. Grangetto, R. Gaeta, and M. Sereno. On the fly gaussian elimination for lt codes. IEEE Commun. Lett., 2009.

[4] N. Burri, P. Von Rickenbach, and R. Wattenhofer. Dozer: ultra-low power data gathering in sensor networks. In ACM/IEEE IPSN, 2007.

[5] J. W. Byers, M. Luby, M. Mitzenmacher, and A. Rege. A digital fountain approach to reliable distribution of bulk data. In ACM SIGCOMM, 1998.

[6] Q. Cao, T. Abdelzaher, T. He, and R. Kravets. Cluster-based forwarding for reliable end-to-end delivery in wireless sensor networks. In IEEE INFOCOM, 2007.

[7] O. Chipara, C. Lu, T. C. Bailey, and G.-C. Roman. Reliable clinical monitoring using wireless sensor networks: experiences in a step-down hospital unit. In ACM SenSys, 2010.

[8] P. Corke, T. Wark, R. Jurdak, W. Hu, P. Valencia, and D. Moore. Environmental wireless sensor networks. Proceedings of the IEEE, 2010.

[9] W. Du, Z. Xing, M. Li, B. He, L. H. C. Chua, and H. Miao. Optimal sensor placement and measurement of wind for urban ecological studies. In ACM/IEEE IPSN, 2014.

[10] H. Dubois-Ferrière, D. Estrin, and M. Vetterli. Packet combining in sensor networks. In ACM SenSys, 2005.

[11] H. Dubois-Ferrire, R. Meier, L. Fabre, and P. Metrailler. Tinynode: A comprehensive platform for wsn applications. In ACM/IEEE IPSN, 2006.

[12] S. Duquennoy, O. Landsiedel, and T. Voigt. Let the tree bloom: scalable opportunistic routing with ORPL. In ACM SenSys, 2013.

[13] P. Dutta, S. Dawson-Haggerty, Y. Chen, C.-J. M. Liang, and A. Terzis. Design and evaluation of a versatile and efficient receiver-initiated link layer for low-power wireless. In ACM SenSys, 2010.

[14] P. Dutta, J. Hui, J. Jeong, S. Kim, C. Sharp, J. Taneja, G. Tolle, K. Whitehouse, and D. Culler. Trio: enabling sustainable and scalable outdoor wireless sensor network deployments. In ACM/IEEE IPSN, 2006.

[15] R. K. Ganti, P. Jayachandran, H. Luo, and T. F. Abdelzaher. Datalink streaming in wireless sensor networks. In ACM SenSys, 2006.

[16] Y. Gao, J. Bu, W. Dong, C. Chen, L. Rao, and X. Liu. Exploiting concurrency for efficient dissemination in wireless sensor networks. IEEE Trans. on Parallel and Distributed Systems, 2013.

[17] O. Gnawali, R. Fonseca, K. Jamieson, D. Moss, and P. Levis. Collec-tion tree protocol. In ACM SenSys, 2009.

[18] Y. Gu and T. He. Data forwarding in extremely low duty-cycle sensor networks with unreliable communication links. In ACM SenSys, 2007.

[19] A. Gudipati and S. Katti. Strider: automatic rate adaptation and collision handling. In ACM SIGCOMM.

[20] T. He, P. Vicaire, T. Yan, Q. Cao, G. Zhou, L. Gu, L. Luo, R. Stoleru, J. Stankovic, and T. Abdelzaher. Achieving long-term surveillance in vigilnet. In IEEE INFOCOM, 2006.

[21] X. Jiang, M. Van Ly, J. Taneja, P. Dutta, and D. Culler. Experiences with a high-fidelity wireless building energy auditing network. In ACM SenSys, 2009.

[22] Y. Kim, T. Schmid, Z. M. Charbiwala, J. Friedman, and M. B. Srivas-tava. NAWMS: nonintrusive autonomous water monitoring system. In ACM SenSys, 2008.

[23] J. Ko, C. Lu, M. B. Srivastava, J. A. Stankovic, A. Terzis, and M. Welsh. Wireless sensor networks for healthcare. Proceedings of the IEEE, 2010.

[24] O. Landsiedel, E. Ghadimi, S. Duquennoy, and M. Johansson. Low power, low delay: opportunistic routing meets duty cycling. In ACM/IEEE IPSN, 2012.

[25] K. Langendoen, A. Baggio, and 0. Visser. Murphy loves potatoes: experiences from a pilot sensor network deployment in precision agriculture. In IEEE IPDPS, 2006.

[26] T. Le Dinh, W. Hu, P. Sikka, P. Corke, L. Overs, and S. Brosnan. De-sign and deployment of a remote robust sensor network: Experiences from an outdoor water quality monitoring network. In IEEE LCN, 2007.

[27] P. A. Levis, N. Patel, D. Culler, and S. Shenker. Trickle: A self regulating algorithm for code propagation and maintenance in wireless sensor networks. In USENIX NSDI, 2004.

[28] F. Li, T. Xiang, Z. Chi, J. Luo, L. Tang, L. Zhao, and Y. Yang. Powering indoor sensing with airflows: a trinity of energy harvesting, synchronous duty-cycling, and sensing. In ACM SenSys, 2013.

[29] C.-J. M. Liang, J. Liu, L. Luo, A. Terzis, and F. Zhao. RACNet: a high-fidelity data center sensing network. In ACM SenSys, 2009.

[30] K. C.-J. Lin, N. Kushman, and D. Katabi. ZipTx: Harnessing partial packets in 802.11 networks. In ACM MobiCom, 2008.

[31] D. Liu, Z. Cao, J. Wang, Y. He, M. Hou, and Y. Liu. DOF: Duplicate detectable opportunistic forwarding in duty-cycled wireless sensor networks. In IEEE ICNP, 2013.

[32] K. Liu, M. Li, Y. Liu, M. Li, Z. Guo, and F. Hong. Passive diagnosis for wireless sensor networks. In ACM SenSys, 2008.

[33] Y. Liu, Y. He, M. Li, J. Wang, K. Liu, L. Mo, W. Dong, Z. Yang, M. Xi, J. Zhao, et al. Does wireless sensor network scale? a measurement study on greenorbs. In IEEE INFOCOM, 2011.

[34] H. Lu, F. Lu, C. FOH, and J. Cai. LT-W: Improving LT decoding with Wiedemann solver. IEEE Trans. on Information Theory, 2013.

[35] M. Luby. LT codes. In IEEE FOCS, 2002.

[36] D. Moss and P. Levis. Box-macs: Exploiting physical and link layer boundaries in low-power networking. Technical Report Technical Report SING-08-00, Stanford University, 2008.

[37] R. Musaloiu-E, C.-J. M. Liang, and A. Terzis. Koala: Ultra-low power data retrieval in wireless sensor networks. In ACM/IEEE IPSN, 2008.

[38] J. Perry, P. A. Iannucci, K. E. Fleming, H. Balakrishnan, and D. Shah. Spinal codes. In ACM SIGCOMM, 2012.

[39] M. Rossi, G. Zanca, L. Stabellini, R. Crepaldi, A. Harris, and M. Zorzi. SYNAPSE: A network reprogramming protocol for wireless sensor networks using fountain codes. In IEEE SECON, 2008.

[40] G. Simon, M. Maróti, A. Lédeczi, G. Balogh, B. Kusy, A. Nádas, G. Pap, J. Sallai, and K. Frampton. Sensor network-based counter-sniper system. In ACM SenSys, 2004.

[41] K. Srinivasan, P. Dutta, A. Tavakoli, and P. Levis. An empirical study of low-power wireless. ACM Trans. on Sensor Networks, 2010.

[42] I. Talzi, A. Hasler, S. Gruber, and C. Tschudin. PermaSense: inves-tigating permafrost with a WSN in the Swiss Alps. In ACM EmNets, 2007.

[43] A. D. Wood and J. A. Stankovic. Online coding for reliable data transfer in lossy wireless sensor networks. In IEEE DCOSS, 2009.

The invention claimed is:

1. A method for communicating data within a network, the network comprising at least one sink node and a plurality of sensor nodes distributed in an environment, each sensor node having at least one environmental sensor device for generating sensor data relating to the environment;

the method comprising the steps of:
  a first sensor node of the plurality of sensor nodes encoding the sensor data generated on the first sensor node into a data stream using a rateless code, and transmitting the data stream to a second sensor node of the plurality of sensor nodes; and
  the second sensor node receiving the data stream, and decoding the sensor data;

wherein sensor data generated by any of the sensor nodes is relayed from node-to-node to reach the at least one sink node;

wherein each sensor node divides the sensor data it generates into a plurality of blocks, and encodes the sensor data within the data stream as a series of data packets, the data packets comprising differing numbers of corresponding blocks, the method comprising:
(a) for each of a plurality of communication links, each communication link being a communication link between a respective pair of said nodes, forming a respective measure of a quality of the communication link as an average, over a plurality of numbers of blocks, of a respective measure of an expected data transmission quality over the communication link of a data packet comprising that number of blocks; and
(b) modifying the data stream transmitted over at least one of the communication links of the plurality of communication links based on the respective measure of the quality of the communication link;

wherein the average is weighted by a probability value for each of the numbers of blocks, the probability value for each number of blocks being indicative of a proportion of data packets transmitted on the communication link which contain that number of data blocks.

2. The method according to claim 1 in which,
for each number of blocks, the respective measure of the expected data transmission quality over the communication link of a data packet comprising that number of blocks is a typical transmission time, and
whereby the measure of the quality of the communication link is an expected transmission time over the communication link.

3. The method according to claim 1 in which the rateless code comprises symbols which are each formed from a plurality of blocks of the sensor data, the method including one or more of said nodes:
(i) upon receiving symbols formed from at least two of the plurality of blocks determining whether the received symbols are sufficient to decode any blocks of the plurality of blocks, and if so, decoding those blocks, and
subsequently at least once performing the steps of:
(ii) receiving further symbols; and
(ii) determining whether the further received symbols, in combination with the received symbols, are sufficient to decode any of the blocks which were not previously decoded, and if so, decoding those blocks.

4. The method according to claim 3 in which the step of determining whether the received symbols are sufficient to decode any of the plurality of blocks is performed by a step of triangularization, and the decoding is performed by backward substitution.

5. The method according to claim 1 in which the rateless code is a Luby transform (LT) code, comprising symbols which are each formed from a respective sub-set of a plurality of blocks of the sensor data, each sub-set being selected according to a corresponding row of a coefficient matrix, a plurality of said coefficient matrices being stored in a memory of each of the nodes.

6. A method for communicating data within a network, the network comprising at least one sink node and a plurality of sensor nodes distributed in an environment, each sensor node having at least one environmental sensor device for generating sensor data relating to the environment;

the method comprising the steps of:
  a first sensor node of the plurality of sensor nodes encoding the sensor data generated on the first sensor node into a data stream using a rateless code, and transmitting the data stream to a second sensor node of the plurality of sensor nodes; and
  the second sensor node receiving the data stream, and decoding the sensor data;

wherein sensor data generated by any of the sensor nodes is relayed from node-to-node to reach the at least one sink node, wherein each sensor node divides the sensor data it generates into a plurality of blocks, and encodes the sensor data within the data stream as a series of data packets, the data packets comprising differing numbers of corresponding blocks, the method comprising:
  (a) for each of a plurality of communication links, each communication link being a communication link between a respective pair of said nodes, forming a respective measure of a quality of the communication link as an average, over a plurality of numbers of blocks, of a respective measure of an expected data transmission quality over the communication link of a data packet comprising that number of blocks; and
  (b) modifying the data stream transmitted over at least one of the communication links of the plurality of communication links based on the respective measure of the quality of the communication link, wherein each node other than the sink node maintains a respective cumulative sink communication quality measure, the respective cumulative sink communication quality measure for each node being indicative of a quality of communication between that node and the sink node;

the respective cumulative sink communication quality measure being the respective measure of the quality of the communication link to another of the nodes, plus, if the other node is not the sink node, the respective cumulative sink communication quality measure of the other node;

each node being configured to address the data stream to the other node, wherein the data stream generated by a given node encodes the cumulative sink communication quality measure, wherein each node other than the sink node is configured:
  to evaluate, for each of a plurality of other nodes, a respective sum of the communication quality measure of the data link to the other node and, if the other node is not the sink node, the cumulative sink communication quality measure of the other node,
  to determine the one of the plurality of other nodes for which the respective sum is lowest;
  to begin to address the data steam to the determined other node; and
  to update the cumulative sink communication quality measure of the node to be equal to the respective sum for the determined other node.

7. A method for communicating data within a network, the network comprising at least one sink node and a plurality of sensor nodes distributed in an environment, each sensor node having at least one environmental sensor device for generating sensor data relating to the environment;

the method comprising the steps of:
  a first sensor node of the plurality of sensor nodes encoding the sensor data generated on the first sensor node into a data stream using a rateless code, and transmitting the data stream to a second sensor node of the plurality of sensor nodes; and
  the second sensor node receiving the data stream, and decoding the sensor data;

wherein sensor data generated by any of the sensor nodes is relayed from node-to-node to reach the at least one sink node;

wherein each sensor node divides the sensor data it generates into a plurality of blocks, and encodes the sensor data within the data stream as a series of data packets, the data packets comprising differing numbers of corresponding blocks, the method comprising:
  (a) for each of a plurality of communication links, each communication link being a communication link between a respective pair of said nodes, forming a respective measure of a quality of the communication link as an average, over a plurality of numbers of blocks, of a respective measure of an expected data transmission quality over the communication link of a data packet comprising that number of blocks; and
  (b) modifying the data stream transmitted over at least one of the communication links of the plurality of communication links based on the respective measure of the quality of the communication link;

wherein each node other than the sink node maintains a respective cumulative sink communication quality measure, the respective cumulative sink communication quality measure for each node being indicative of a quality of communication between that node and the sink node;

the respective cumulative sink communication quality measure being the respective measure of the quality of the communication link to another of the nodes, plus, if the other node is not the sink node, the respective cumulative sink communication quality measure of the other node;

each node being configured to address the data stream to the other node, wherein the data stream generated by a given node encodes the cumulative sink communication quality measure, wherein each of the nodes has an active state and an inactive state, and being configured to be activated from the inactive state into the active state upon receiving a data packet transmitted by another node and indicative of the other node having a higher cumulative sink communication quality measure.

8. A method for communicating data within a network, the network comprising at least one sink node and a plurality of sensor nodes distributed in an environment, each sensor node having at least one environmental sensor device for generating sensor data relating to the environment;

the method comprising the steps of:
- a first sensor node of the plurality of sensor nodes encoding the sensor data generated on the first sensor node into a data stream using a rateless code, and transmitting the data stream to a second sensor node of the plurality of sensor nodes; and
- the second sensor node receiving the data stream, and decoding the sensor data;

wherein sensor data generated by any of the sensor nodes is relayed from node-to-node to reach the at least one sink node;

wherein, for any given one of the nodes;

the data stream transmitted by the node to another node comprises data packets comprising a specific number of sensor data blocks, each block having a block length; and the method includes:
- (i) determining, for a communication link from the node to the other node, a measure of an error rate on the communication link for packets containing the specific number of blocks, the error rate being an expected distanceless transmission time calculated from an average over blocks of differing block length of a block reception rate,
- (ii) comparing the error rate to at least one of an upper threshold and a lower threshold, and
- (iii) based on the comparison, varying the specific number of blocks and the block length of the blocks.

9. A method for communicating data within a network, the network comprising a plurality of nodes including at least one sink node, data generated by any of the nodes other than the sink node being relayed from node-to-node to reach the sink node;

the method comprising a first node of the plurality of nodes:
- (a) dividing data generated by the first node into data blocks;
- (b) encoding the data blocks by rateless coding into data packets, each data packet comprising a corresponding number of the data blocks;
- (c) transmitting the data packets to another of the plurality of nodes over a communication link,
- (d) forming a measure of a quality of the communication link as an average, over a plurality of numbers of blocks, of a respective measure of an expected data transmission quality over the communication link of a data packet comprising that number of blocks; and
- (e) modifying the data stream transmitted over the communication link based on the measure of the quality of the communication link;

wherein the average is weighted by a probability value for each of the numbers of blocks, the probability value for each number of blocks being indicative of a proportion of data packets transmitted on the communication link which contain that number of data blocks.

10. The method according to claim 9 in which,
for each number of blocks, the respective measure of the expected data transmission quality over the communication link of a data packet comprising that number of blocks, is a typical transmission time, and
the measure of the quality of the communication link is an expected transmission time over the communication link.

11. The method according to claim 9 in which each node other than the sink node records a respective cumulative sink communication quality measure, the cumulative sink communication quality measure for each respective node being indicative of the quality of the communication between the node and the sink node, the cumulative measure being the measure of the quality of the communication link to another of the nodes, plus, if the other node is not the sink node, the cumulative communication quality measure of the other node.

12. The method according to claim 11 in which each node is configured to address the data stream to the other node.

13. The method according to claim 11 in which the data stream generated by a given node encodes the cumulative sink communication quality measure.

14. A method for communicating data within a network, the network comprising a plurality of nodes including at least one sink node, data generated by any of the nodes other than the sink node being relayed from node-to-node to reach the sink node;

the method comprising a first node of the plurality of nodes:
- (a) dividing data generated by the first node into data blocks;
- (b) encoding the data blocks by rateless coding into data packets, each data packet comprising a corresponding number of the data blocks;
- (c) transmitting the data packets to another of the plurality of nodes over a communication link,
- (d) forming a measure of a quality of the communication link as an average, over a plurality of numbers of blocks, of a respective measure of an expected data transmission quality over the communication link of a data packet comprising that number of blocks; and
- (e) modifying the data stream transmitted over the communication link based on the measure of the quality of the communication link, wherein each node other than the sink node records a respective cumulative sink communication quality measure, the cumulative sink communication quality measure for each respective node being indicative of the quality of the communication between the node and the sink node;

the cumulative measure being the measure of the quality of the communication link to another of the nodes, plus, if the other node is not the sink node, the cumulative communication quality measure of the other node;

wherein the data stream generated by a given node encodes the cumulative sink communication quality measure;

wherein each node other than the sink node is configured:
- to evaluate, for each of a plurality of other nodes, a respective sum of the communication quality measure of the data link to the other node and, if the other node is not a sink node, the cumulative sink communication quality measure of the other node,
- to determine the one of the plurality of other nodes for which the respective sum is lowest;
- to begin to address the data steam to the determined other node; and
- to update the cumulative sink communication quality measure of the node to be equal to the respective sum for the determined other node.

15. A method for communicating data within a network, the network comprising a plurality of nodes including at least one sink node, data generated by any of the nodes other than the sink node being relayed from node-to-node to reach the sink node;

the method comprising a first node of the plurality of nodes:
- (a) dividing data generated by the first node into data blocks;
- (b) encoding the data blocks by rateless coding into data packets, each data packet comprising a corresponding number of the data blocks;
- (c) transmitting the data packets to another of the plurality of nodes over a communication link;
- (d) forming a measure of a quality of the communication link as an average, over a plurality of numbers of blocks, of a respective measure of an expected data transmission quality over the communication link of a data packet comprising that number of blocks; and
- (e) modifying the data stream transmitted over the communication link based on the measure of the quality of the communication link;

wherein each node other than the sink node records a respective cumulative sink communication quality measure, the cumulative sink communication quality measure for each respective node being indicative of the quality of the communication between the node and the sink node;

the cumulative measure being the measure of the quality of the communication link to another of the nodes, plus, if the other node is not the sink node, the cumulative communication quality measure of the other node;

wherein the data stream generated by a given node encodes the cumulative sink communication quality measure; and wherein each of the nodes has an active state and an inactive state, and is configured to be activated from the inactive state into the active state upon receiving a data packet transmitted by another node containing data indicative of the other node having a higher cumulative sink communication quality measure.

* * * * *